US008923225B2

(12) United States Patent
Sydor et al.

(10) Patent No.: US 8,923,225 B2
(45) Date of Patent: Dec. 30, 2014

(54) COGNITIVE WIFI RADIO NETWORK

(75) Inventors: John Sydor, Ottawa (CA); David Roberts, Ashton (CA); Bernard Doray, Ottawa (CA); Siva Palaninathan, Kanata (CA); Wayne Brett, Kanata (CA); Mustapha Bennai, Ottawa (CA)

(73) Assignee: Her Majesty the Queen in Right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 314 days.

(21) Appl. No.: 13/440,078

(22) Filed: Apr. 5, 2012

(65) Prior Publication Data

US 2012/0257585 A1    Oct. 11, 2012

Related U.S. Application Data

(60) Provisional application No. 61/471,982, filed on Apr. 5, 2011.

(51) Int. Cl.
| | |
|---|---|
| *H04W 4/00* | (2009.01) |
| *H04W 72/08* | (2009.01) |
| *H04W 16/14* | (2009.01) |
| *H04W 84/12* | (2009.01) |

(52) U.S. Cl.
CPC ............ *H04W 72/082* (2013.01); *H04W 16/14* (2013.01); *H04W 84/12* (2013.01)
USPC ........................................................ 370/329

(58) Field of Classification Search
CPC ... G06F 21/60; H04L 43/0811; H04W 4/025; H04W 12/08; H04W 16/14; H04W 64/00; H04W 72/082; H04W 72/04; H04W 84/12
See application file for complete search history.

(56) References Cited

U.S. PATENT DOCUMENTS

| | | | |
|---|---|---|---|
| 6,611,231 B2 | 8/2003 | Crilly, Jr. et al. | 342/378 |
| 7,477,621 B1 * | 1/2009 | Loc et al. | 370/329 |
| 2005/0032537 A1 * | 2/2005 | Miyashita | 455/517 |
| 2005/0276276 A1 * | 12/2005 | Davis | 370/447 |
| 2009/0310619 A1 * | 12/2009 | Brommer | 370/449 |
| 2010/0135226 A1 | 6/2010 | Chandramouli et al. | 370/329 |
| 2011/0019652 A1 | 1/2011 | Atwal | 370/338 |
| 2011/0032892 A1 | 2/2011 | Bahl et al. | 370/329 |

OTHER PUBLICATIONS

Paul et al, "WiFiRe: Rural Area Broadband Access using the WiFi PHY and a Multisector TDD MAC", IEEE Communications Magazine, vol. 45, Issue 1, pp. 111-119, Jan. 2007.

(Continued)

*Primary Examiner* — Yong Zhou
(74) *Attorney, Agent, or Firm* — Teitelbaum & MacLean; Neil Teitelbaum; Doug MacLean

(57) ABSTRACT

The invention relates to a cognitive radio (CR) WiFi network which includes a plurality of radio environment aware WiFi terminals, which collect local WiFi interference information and send this information to a CR network management system (NMS). The CR NMS includes a database for storing historical records of the interference information obtained from the terminals, and cognitive engines for analyzing the stored historical interference records and determining terminal-specific transmission and reception parameters. In one embodiment the network implements a deterministic NMS-directed networks-wide TDD/TDM scheduling of WiFi communications for optimal channel re-use and interference avoidance, and a novel terminal synchronization mechanism.

21 Claims, 13 Drawing Sheets

(56) References Cited

OTHER PUBLICATIONS

Bahl et al, "White space networking with wi-fi like connectivity", Proc. ACM SIGCOMM, Aug. 2009.

J. Sydor, "Messaging and spectrum sharing between ad-hoc cognitive radio networks", Proc. IEEE International Symposium on Circuits and Systems (ISCAS'06), May 2006.

Panirahi et al, "TDMA scheduling in long-distance WIFI networks", Proc. of IEEE INFOCOM 2009, Apr. 2009.

Patra et al, "WILDNet: design and implementation of high performance WIFI based long distance networks", Proc. of the 4th USENIX, Symposium on Networked Systems Design Implementation 2007.

Mitran et al, "On the capacity and scheduling of a multi-sector cell with co-channel interference knowledge", Proc. of the 9th IFIP Annual Mediterranean Ad Hoc Workshop, France, Jun. 2010.

Macedo, E. Sousa, "In-cell frequency reuse for broadband indoor wireless systems using sectored antennas," Wireless Personal Communications, vol. 10, No. 1, Jun. 1999.

\* cited by examiner

| Specific to the addressed WIFI_CR Sensor ||
|---|---|
| Sensor Attribute | Comments |
| Sensing Request Message ID (S_R_M_ID) | The ID of the CR_NMS sensor inquiry message that actuated this specific SSURF message. |
| GPS Time Stamp | Time stamp of the SSURF message being returned to the CR_NMS, taken from the GPS system just prior to the message being sent. Null if the WIFI_CR has no GPS |
| GPS Location | GPS location. Null if the WIFI_CR has no GPS |
| Sensor ID | Identity of the WIFI_CR (MAC address) |
| TX Duty Cycle | Ratio of transmission to reception time for this WIFI_CR |
| TX average data rate | Average data rate of link |
| Channel Number Sensed | Channel (1-11) which the sensor is set on. |
| Spectral Occupancy information | 100 MHz spectrum analysis using an energy detector with sensitivity of -85 dBm/600 Khz . |
| Specific to each detected IEEE 802.11 interference source (1-n) ||
| Detected 802.11 g Interferer (n) | Channel | Channel of transmission for (n) |
| | SSID | SSID of Interferer (n) |
| | RSSI | Average RSSI of all (n) packets |
| | Number of packets detected | Number of packets from (n) that have been detected |
| | Total Duration | Sum total duration time of packets from (n) |
| | MAC source address | MAC source address of (n) |
| | MAC destination address | MAC destination address of (n) |

FIG. 6

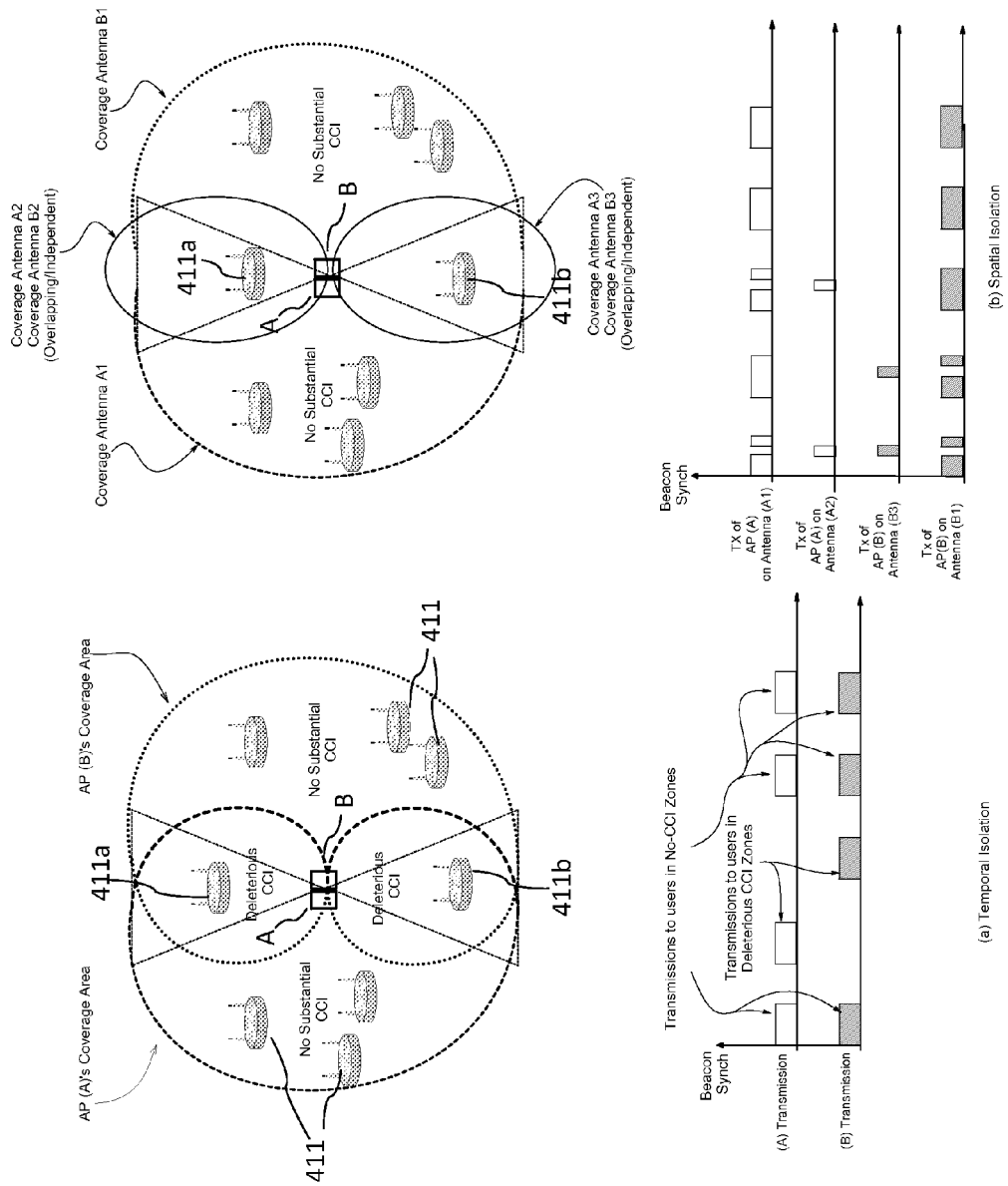

COGNITIVE WIFI RADIO NETWORK

CROSS-REFERENCE TO RELATED APPLICATIONS

The present invention claims priority from U.S. Provisional Patent Application No. 61/471,982 filed Apr. 5, 2011, which is incorporated herein by reference.

TECHNICAL FIELD

The present invention generally relates to wireless networks and devices used therein, and more particularly relates to WiFi-type radio networks utilizing distributed interference sensing and interference avoidance.

BACKGROUND OF THE INVENTION

The proliferation of WiFi networks based on the IEEE 802.11 wireless RLAN (radio local area network) standard, commercially known as WiFi®, Wi-Fi or WIFI, had led to availability of inexpensive WiFi devices and chipsets implementing various aspects of the IEEE 802.11 standards. This makes them attractive for delivering 'last mile' voice and data services from a fiber backbone to end users in rural area with low population density, or generally in areas where existing alternatives for the 'last mile' service delivery, such as WIMAX, land-line phone networks, TV cable and optical fiber based solutions, are too expensive or unfeasible for other reasons. However, conventional WiFi networks are limited to relatively compact environments, such as homes and small offices, and are not suitable for wide-area networks where spectrum may be re-used in different sectors of a base transceiver station (BTS) site.

The MAC (medium access control) layer of conventional WiFi uses a distributed coordination function (DCF) to coordinate transmission between various WiFi terminals in the network. The DCF of the IEEE 802.11 family of standards typically employ carrier sense multiple access with collision avoidance (CSMA/CA) method for network access, wherein a WiFi terminal wishing to transmit data in a particular channel has to first listen to the channel for a predetermined amount of time to determine whether or not another terminal is transmitting on the channel within the wireless range. If the channel is clear from interference, i.e. "idle," then the WiFi terminal is permitted to begin the transmission process. If the channel is sensed as "busy," the WiFi terminal delays its transmission for a random duration of time. Collision avoidance is used to improve CSMA performance by not allowing wireless transmission of a terminal if another terminal is transmitting, thus reducing the probability of collision due to the use of a random truncated binary exponential backoff time.

However, when a WiFi network includes multiple access points (APs) each providing wireless access to a plurality of client terminals, same WiFi channels may be used by different APs in overlapping areas, the conventional WiFi MAC becomes inefficient, and the transmission in all sectors must be synchronized. One approach to building a WLAN network based in WiFi chipsets is disclosed in an article by K. Paul, A. Varghese, et al, entitled "WiFiRe: Rural Area Broadband Access using the WiFi PHY and a Multisector TDD MAC", published in IEEE Communications Magazine, January 2007, Voi. 45, Issue 1, pp. 111-119, which is incorporated herein by reference. The system described by Paul et al uses WiFi PHY layer of WiFi chipsets and ads a single-channel multisector TDD (time division duplexing) MAC using directional antennas. The WiFiRe MAC of Paul et al is a derivative of the WiMAX MAC which uses the TDD/TDMA approach with ranging in which all uplink terminals are synchronized to the base station and are ordered when to transmit by means of specialized messages such as UL-MAP and DL-MAP transmitted by the base station in a MAC header. One drawback of the WiFiRe system is its insufficient resilience to ISM band interference, as the loss of either of the UL-MAP or the DL-MAP messages would severely affect the uplink and downlink scheduling, causing a multiplicity of errors that may last for a period of time longer than the actual interference event.

An object of the present invention is to address at least some of the deficiencies of the prior art by providing a cognitive-radio type WiFi-based network system and method with efficient interference avoidance.

SUMMARY OF THE INVENTION

Accordingly, an aspect of the present invention relates to a method for avoiding interference in a WiFi network comprising a plurality of WiFi terminals. The method comprises the following steps: a) using one or more of the WiFi terminals to collect radio interference information, wherein the radio interference information comprises packet header information for WiFi packets received over a plurality of WiFi channels; b) communicating the radio interference information from the one or more of the WiFi terminals to a network management system (NMS) for storing in a network radio environment database (NRED); and, c) receiving transmission and reception parameters sent by the NMS to the one or more of the WiFi terminals for use thereof in WiFi data communications by said one or more of the WiFi terminals so as to avoid radio interference in the WiFi network. According to a feature of the present invention, the transmission and reception parameters comprise at least one of: WiFi channel identifier for data communication, time slot assignments, transmission power assignments, transmission or reception antenna direction, and transmission data rate.

One aspect of the present invention relates to a WiFi terminal, which comprises one or more WiFi radios configured for supporting WiFi data communications over one or more WiFi channels in accordance with channel and transmission time slot assignments received from the NMS, and for sensing radio signals in other WiFi channels that are not assigned to the respective WiFi terminal for data communications, and detecting WiFi packets therein. One or more processors are further provided for collecting interference information related to the WiFi packets detected in the other WiFi channels, wherein the interference information comprises packet header information, for transmitting to a network management system (NMS) using a wired or wireless connection.

Another feature of the present invention provides a WiFi network system, which comprises a plurality of the WiFi terminals as described hereinabove, and the network management system (NMS). The NMS comprises a collector module for collecting the interference information from the WiFi terminals, and for communicating the transmission and reception parameters comprising the channel and transmission time slot assignments to the WiFi terminals, and further comprises a network radio environment database (NRED) for storing time-stamped records of the interference information collected from the WiFi terminals, and an analysis module for analyzing historical records of the interference information stored in the NRED and for generating the transmission and reception parameters for the WiFi terminals.

BRIEF DESCRIPTION OF THE DRAWINGS

The invention will be described in greater detail with reference to the accompanying drawings which represent preferred embodiments thereof, in which like elements are indicated with like reference numerals, and wherein:

FIG. 6 is a table showing exemplary interference information that a CR WiFi terminal communicates to the NMS;

FIGS. 13A and 13B are schematic diagrams illustrating two approaches for same-cell interference avoidance and same channel reuse using temporal and spatial isolation, respectively.

DETAILED DESCRIPTION

Figure 1:
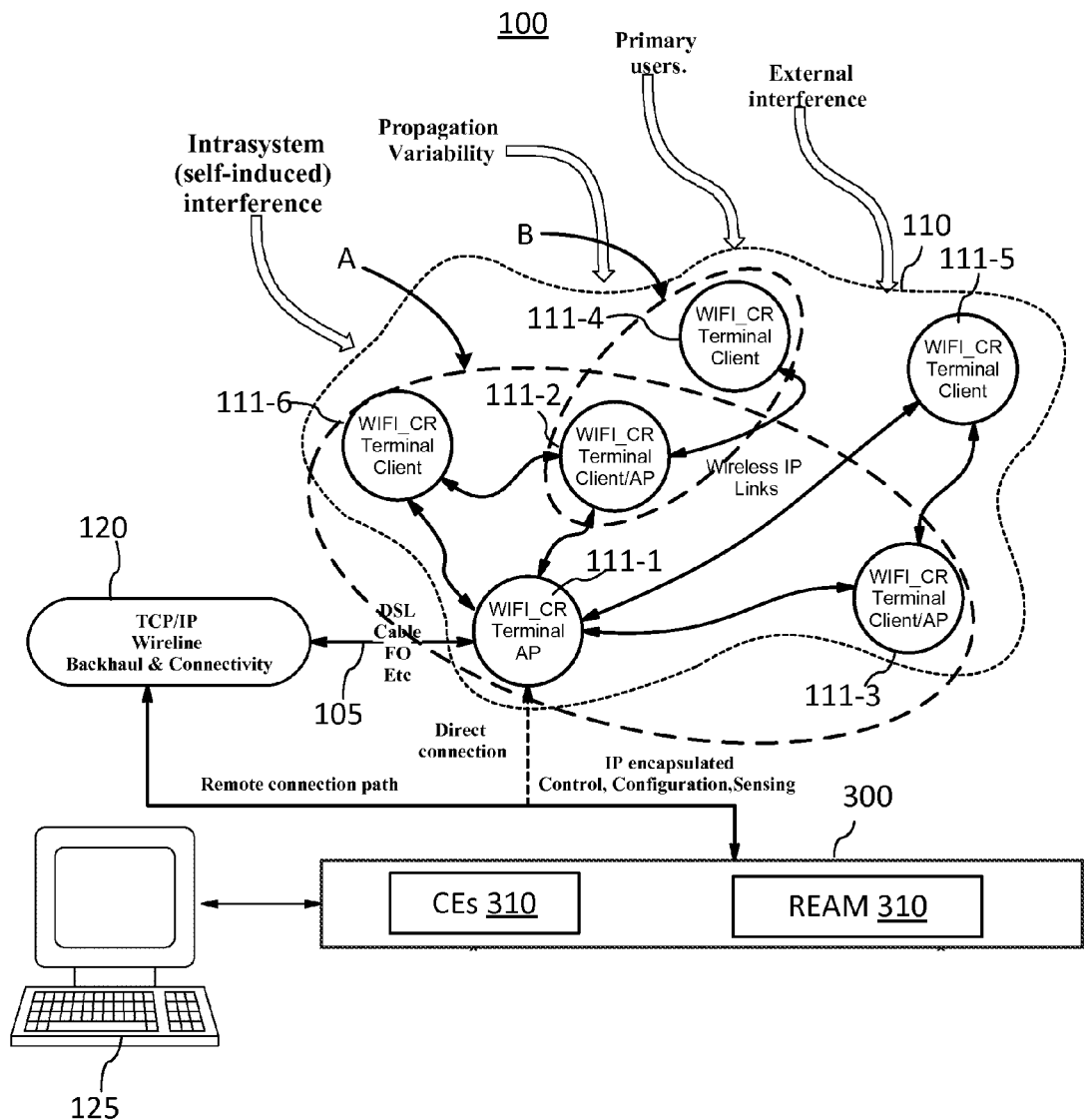
FIG. 1 is a schematic block diagram of an exemplary CR WiFi network in accordance with embodiment of the present invention.

The invention will be described in connection with a number of exemplary embodiments. To facilitate an understanding of the invention, many aspects of the invention are described in terms of sequences of actions to be performed by functional elements of a CR WiFi network system, including but not limited to WiFi_CR terminals. It will be recognized that in each of the embodiments, the various actions including those depicted as blocks in flow-chart illustrations and block schemes could be performed by specialized circuits, for example discrete logic gates interconnected to perform a specialized function, by computer program instructions being executed by one or more processors, or by a combination of both. Thus, the various aspects of the invention may be embodied in many different forms, and all such forms are contemplated to be within the scope of the invention.

As used herein, the terms "first", "second" and so forth are not intended to imply sequential ordering, but rather are intended to distinguish one element from another unless explicitly stated.

An aspect of the present invention relates to a network system and method implementing principles of cognitive radio (CR) in WiFi. A network of radio terminals is referred to as a CR system if it has a combination of the following five features: (a) a signal processing subsystem with a configurable PHY layer characteristics; (b) a sensing system that is in part dependent on the PHY layer of (a) but embodies its own signal processing features; (c) a Media Access and Control (MAC) subsystem that supports the physical configuration and allows sensing information to flow to (d) an addressable, dynamic memory which is either created by collating the information derived from the sensing subsystem or is embedded as a set of rules or policies; and, (e) a set of cognitive, i.e. decision making, engines that process information from the addressable memory or have direct connection to the sensing systems and have the ability to modify the performance of the physical structure, in a manner enhancing the operation of the CR.

The International Telecommunication Union (ITU) summarized the concept of Cognitive Radio as 'a radio system employing technology that allows the system to obtain knowledge of its operational and geographical environment, established policies and its internal state; to dynamically and autonomously adjust its operational parameters and protocols according to its obtained knowledge in order to achieve predefined objectives; and to learn from the results obtained'. Exemplary network systems described herein can undertake all of these functions and attributes using measurement-capable wireless terminals operating under the control of a network management system (NMS), which implements 'cognitive' algorithms to adapt the network to a particular deployment scenario. One example of the deployment scenario wherein embodiments of the present invention may be implemented is the Industrial, Scientific, and Medical (ISM) Bands, also known as the License Exempt radio bands found principally at around 2.45 and 5.7 GHz, and within which the principal technology in use is known as Wi-Fi, or otherwise as variants of the IEEE 802.11 standard.

An aspect of the present invention provides a flexible cognitive radio platform wherein the five CR elements may be embodied within constraints of an off-the-shelf technology. The present invention enables provisioning of a CR network system that is built using off-the-shelf technology including commercially available WiFi devices. We found that certain IEEE 802.11 a/g radios could satisfy some of the requirements identified above, especially those related to PHY layer control. Single-board computers customized for wireless router applications, known as WiFi routers, are supplied by a number of vendors and sold at low cost, which makes them attractive for building wireless internet systems. The routers can be equipped with multiple WiFi radio cards, which are packet radio devices operating in the ISM bands and compliant to a set of IEEE radio standards generically known as the IEEE 802.11(b,g,a,n) and commonly referred to herein as WiFi radios, thereby providing multi-band operation at 2.4 and 5.8 GHz. WiFi radio cards typically convert WiFi RF packets into baseband WiFi data packets or IP packets and vice versa. They can be modified, with the addition of RF frequency translation subsystems, to work in other frequency bands, such as the TV bands or at 60 GHz by way of example. Available software drivers can be used to configure specific IEEE 802.11a/g radio chipsets to enable them to work in a number of atypical wireless RLAN modes. For example, embodiments of the present invention utilize a Linux-based driver known as 'MadWifi' for Atheros 802.11 chipsets, which was initially released by Atheros and later enhanced by the Linux developers community. Our modifications to the MadWifi driver made it possible to implement interference monitoring and rapidly change such characteristics of a WiFi radio as EIRP (equivalent isotropically radiated power), WiFi channel setting, and modulation rate. Other suitable software drivers may also be used to implement same or similar functionalities, as will be appreciated by those skilled in the art. Certain IEEE 802.11 protocol features such as RTS/CTS, acknowledgement, CSMA/CA inactivation, contention window size, and CCA threshold can also be individually and independently set on the WiFi radios. The ability to adjust or disable such features may be advantageous for implementing a configurable PHY layer of the WiFi CR system of the present invention wherein the decision as to when, or when not, to transmit RF WiFi packets is a deterministic process controlled by specific CR algorithms. The pseudo-random and asynchronous exponential back-off algorithm, which is a core feature of the IEEE 802.11 DCF protocol, is either entirely disabled or heavily limited in at least some embodiments of the present invention.

With reference to FIG. 1, there is illustrated a CR WiFi network system 100 according to an embodiment of the present invention. The CR WiFi network system 100, hereinafter referred to simply as network 100, includes a plurality of WiFi_CR terminals 111-1 to 111-5, hereinafter also commonly referred to as WiFi_CR terminals 111 or simply as terminals 111. Although only 5 terminals 111 are shown, typical embodiments of the network 100 are expected to include many more WiFi_CR terminals 111, although may also include fewer terminals 111 than shown. Terminals 111-1, 111-2 and 111-3 operate as access points (APs) providing wireless access to terminals 111-4, 111-5, 111-6, which are referred to herein as client terminals or simply as clients. Terminal 111-1 has a wireline connection 105 to an IP (Internet protocol) backbone network by means of a backhaul network server 120; it serves as the main AP of the network 100, and is referred herein also as the base station (BS) 111-1. The wireline connection 105 may be implemented, for example, using a TV cable, a DSL, or an optical fiber line. Terminals 111-2 and 111-3 function as clients of the BS 111-1, and as APs for terminals 111-4 and 111-5.

Figure 2:
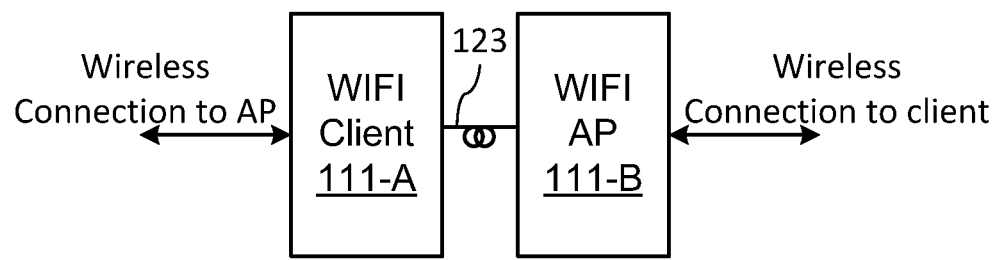
FIG. 2 is a schematic diagram of a client/AP WiFi terminal implementing a hop node in the CR WiFi network of FIG. 1.

With reference to FIG. 2, in one embodiment the AP/client WiFi_CR terminals 111-2 and 111-3, which are also referred to herein also as relay terminals, may each be implemented as a WiFi_CR client Terminal 111-A and a WiFi_CR AP terminal 111-B connected back-to-back using a suitable wireline connection 123 such as a RS-485 cable.

Referring back to FIG. 1, terminals 111-6 and 111-5 may each communicate with two APs, as illustrated in the figure with double-sided arrows representing wireless connections.

According to an embodiment of the present invention, each of the terminals 111 is implemented using conventional WiFi hardware such as one or more WiFi radios, as described hereinbelow in further detail with reference to FIG. 5. However, terminals 111 differ from conventional WiFi terminals in at least two important respects: a) they include means for sensing interfering radio signals at a variety of RF frequencies within the operating frequency range of network 100 to obtain WiFi and other RF interference information at their respective locations, and b) they employ a novel TDD/TDM (time-domain duplexing/time-domain multiplexing) mechanism to coordinate their transmission and reception so as to avoid interference between the terminals 111. Thus, terminals 111 include conventional PHY-level hardware for processing of communication packets, but employ a novel transmission synchronization algorithm.

The network 100 includes a network management system (NMS) 300, which may be implemented for example using a general purpose computer 125 having a TCP/IP connection to the BS 111-1. The computer 125 may be co-located with the BS 111-1, or having a remote connection thereto over a TCP/IP network such as the Internet. In other embodiments, NMS 300 may be implemented using two or more co-located or remotely networked computers. The term 'computer', as used herein, encompasses general purpose computers, specialized computers and computer-type network devices that include a digital processor, computer-readable memory and a network interface.

Figure 3:
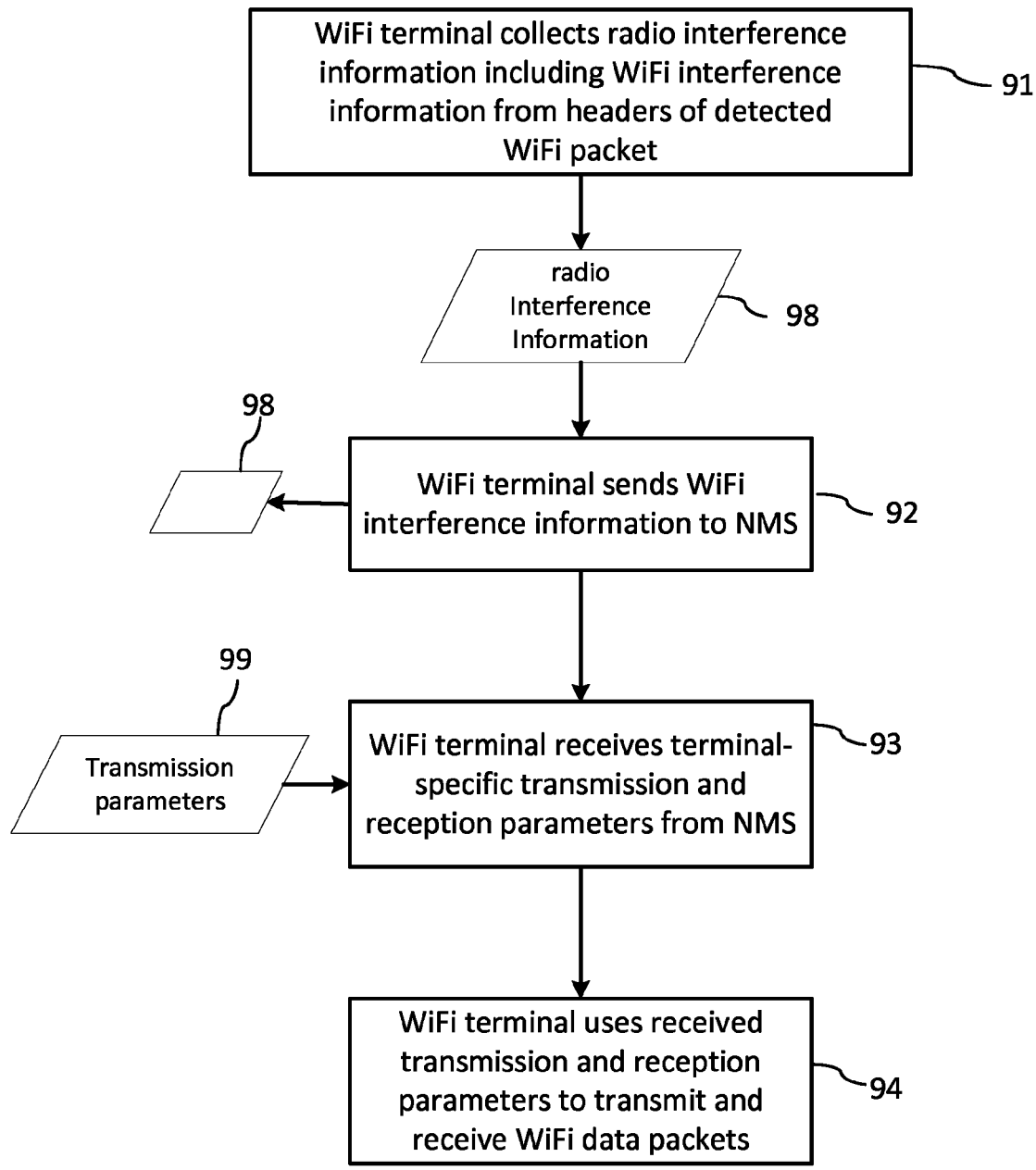
FIG. 3 is a flowchart of a method for interference avoidance by WiFi terminals of the CR WiFi network.

One aspect of the present invention provides a method for interference avoidance in the WiFi network 100. With reference to FIG. 3, one embodiment of the method includes the following general steps performed at one or more of the WiFi terminals 111. At step 91, the WiFi_CR terminal 111 collects radio interference information 98. The term 'radio interference information' as used herein refers to information related to electromagnetic radiation in the operating RF frequency range of the WiFi_CR terminal 111 that exists at the location of the WiFi_CR terminal and can interfere with normal operation thereof 'Radio interference' as used herein includes WiFi interference, which is understood as a potential interference due to the presence, at the location of the WiFi_CR terminal 111, of WiFi signals that are not directed, i.e. addressed, to that WiFi_CR terminal 111, and non-WiFi interference that is understood as a potential interference due to the presence, at the location of the WiFi_CR terminal 111, electromagnetic radiation from non-WiFi sources, such as from primary users of the ISM band. According to an aspect of the present invention, step 91 includes using a WiFi radio provided in the WiFi_CR Terminal 111 for collecting WiFi interference information that includes collecting packet header information for WiFi packets received over a plurality of WiFi channels.

Next, at step 92 the radio interference information 98 is sent by the WiFi_CR Terminal 111 to the NMS 300, either via the wired connection if the WiFi_CR Terminal 111 is BS 111-1, or via a wireless connection to the BS 111-1. In step 93, the WiFi_CR Terminal 111 receives back from the NMS 300 transmission and reception parameters 99. In one embodiment, these transmission and reception parameters 99 are optimized for network-wide radio interference avoidance. These transmission and reception parameters 99 are terminal-specific and are used in step 94 by the WiFi_CR Terminal 111 to transmit and receive WiFi data packets. In one embodiment, the aforedescribed process of FIG. 3 is performed by a plurality of the terminals 111. In one embodiment, the transmission and reception parameters 99 include at least one of: WiFi channel identifier for data communication, timeslot assignments for reception and/or transmission of WiFi data packets addresses to the designated terminal, transmission power assignment, and transmission data rate. In embodiments wherein terminals 111 include steerable directional antennas, the transmission and reception parameters 99 may include transmission or reception antenna direction. In one embodiment, the NMS 300 transmits to each of the WiFi terminals 111 a terminal-specific time slot assignment message specifying transmission and reception time slots for the respective WiFi terminal.

Figure 4:
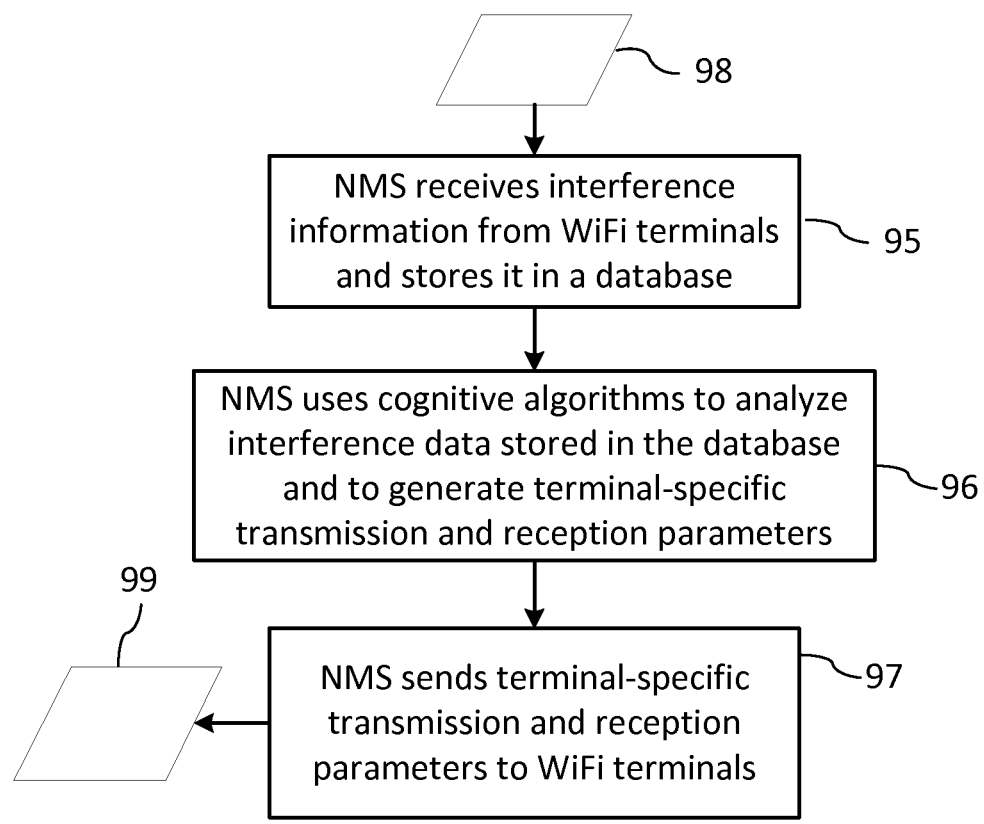
FIG. 4 is a flowchart representing steps performed by a network management system (NMS) of the CR WiFi network for avoiding interference in the network.

With reference to FIG. 4, in step 95 the NMS 300 collects the interference information 98 sent to it by the terminals 111, and stores this information in a network radio environment database (NRED) 320 for storing time-stamped records of the interference information collected from the WiFi_CR terminals 111, and network-related data derived therefrom. In one embodiment NRED 320 provides a radio environment awareness map (REAM) 320, which includes information about radio environment in network 100 at terminals 111 in association with the terminal's logical, i.e. in relation to other terminals, and/or geographical positions in the network. In step 96, NMS 300 analyzes the stored information using an analysis module 310, which is also referred to herein as a cognitive engine (CE) 310, which may embody one or more cognitive algorithms. The CE 310 generates, based on this analysis, the terminal-specific transmission and reception parameters 99 for terminals 111 so as to synchronize their operation and to avoid radio interference in the network. In step 97, NMS 300 communicates the transmission and reception parameters 99 to respective terminals 111. In one embodiment, NMS 300 may transmit to the WiFi terminals a list of WiFi signal parameters to be collected in step 91.

In one embodiment, NMS 300 analyzes the interference information 98 received from the terminals 111 and creates historical interference records for each of the terminals 111, storing these records in NRED 320, which may be implemented using a relational database or any other suitable means for storing historic interference records for terminals 11. These historical interference records may include information related to one or more of the following: WiFi terminal location, direction of the antenna used by the WiFi terminal to collect the interference information 98, WiFi terminal data transmission and reception throughput rates as reported by the terminals, time of measurement, WiFi channel identifier, such as channel number, wherein WiFi interference was detected, and an average received signal strength of the WiFi packets received from detected WiFi interference sources. The historical interference record for at least one of the WiFi terminals 111 stored in NRED 320 may also include time stamped information related to WiFi packets received over one or more of WiFi channels, including source of the WiFi packets, average received signal strength indicator (RSSI) for WiFi signal detected to be form the source address, a number of WiFi packets received from the source address, and WiFi channel occupancy for a source address. The channel occupancy for the source address is a total duration of all WiFi packets originated from the source address divided by sensing time duration.

Figure 5:
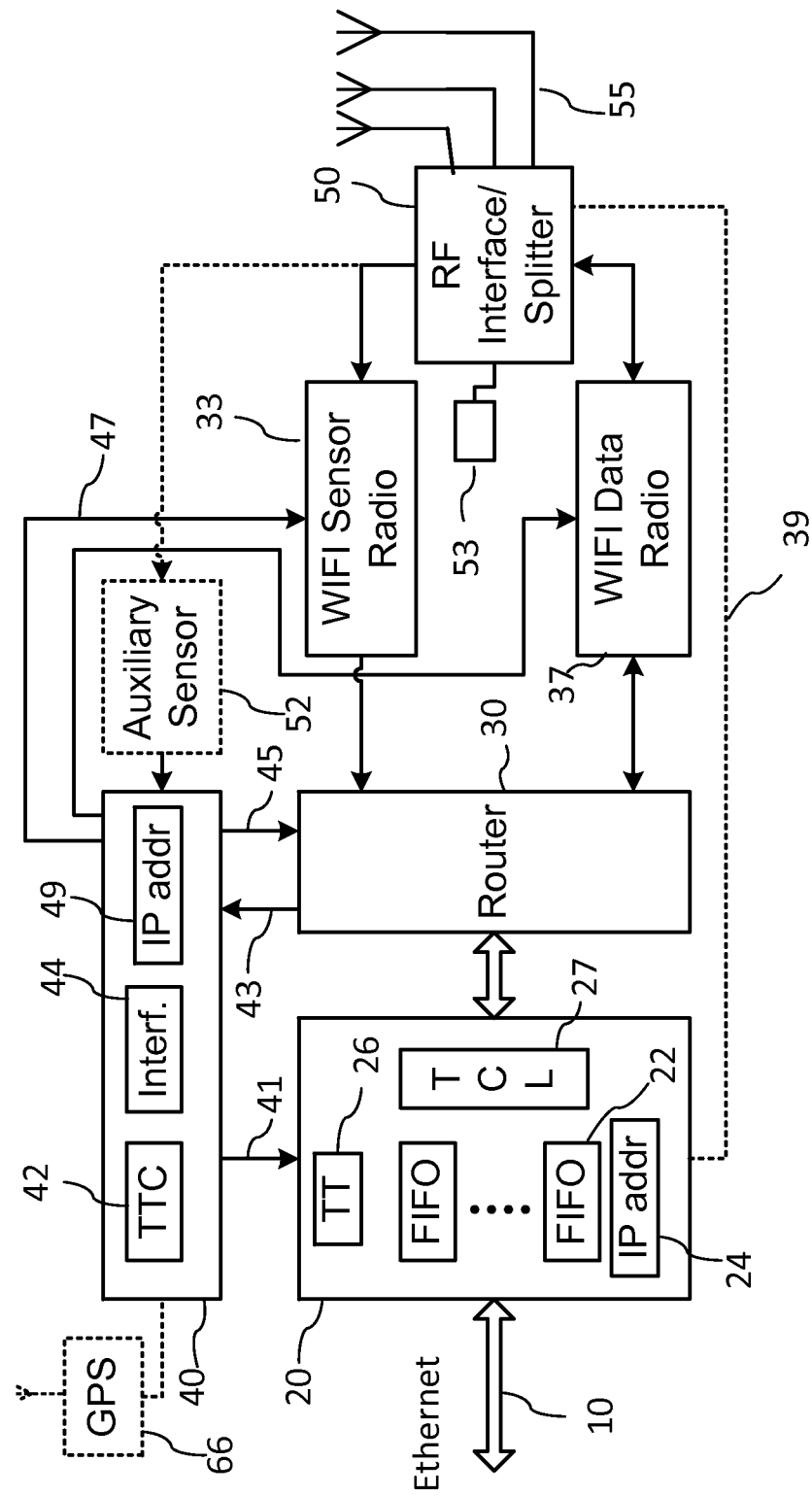
FIG. 5 is a schematic block diagram of a CR WiFi terminal.
Figure 5B:
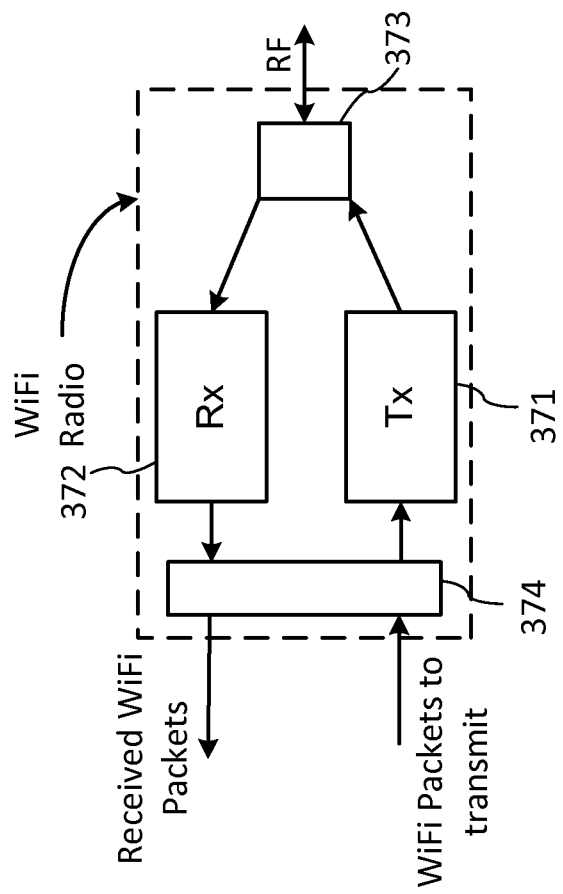
FIG. 5B is a schematic block diagram of a WiFi radio.

With reference to FIG. 5, there is schematically shown a functional block diagram of a WiFi_CR Terminal 111 in one embodiment thereof. Various functional units shown as blocks in FIG. 5 can be integrated or separate structures implemented in either software or hardware or a combination thereof commonly known to provide the functionalities described hereinbelow, including but not limited to microprocessors, DSPs, ASICs, FPGAs, and analogue RF, HF and UHF circuitry. Similarly to conventional WiFi terminals, WiFi_CR Terminal 111 illustrated in FIG. 5 includes a wired Ethernet port 10 for receiving and transmitting Ethernet packets, an antenna 55 for receiving and transmitting WiFi RF signals carrying WiFi packets, which may be embodied as a diversity antenna or steerable antenna array, a router 30 for transforming Ethernet packets into WiFi frames or packets and vice versa, and a WiFi data radio 37, which simplified high-level block diagram is illustrated in FIG. 5B and which may be embodied using conventional WiFi cards. The WiFi data radio 37 is tunable, by means of a tunable RF circuit 373, to receive and transmit at any WiFi channel that is allocated to the WiFi_CR Terminal 111 for data transmission. It includes a WiFi receiver 372 for extracting WiFi packets from RF signals received from the antenna 55, a WiFi transmitter 371 for converting WiFi data packets received from the router 30 into WiFi RF signals, the input RF circuit 373 which may include a tuner and a tunable local oscillator, and an output packet processor 374 which may include a buffer and which implements card-level 802.11 MAC functions, as known in the art. The WiFi data radio 37, which is also referred to herein as the first WiFi radio, is configured to work as a conventional WiFi data radio, converting baseband data packets received from the Ethernet port 10 into RF WiFi signals when in a transmission mode, and converting RF WiFi packets received via antenna 55 into baseband data packets when in a reception mode. In operation, the WiFi data radio 37 supports WiFi data communications over one or more WiFi channels in accordance with channel and transmission time slot assignments received from the NMS 300.

In addition to these common elements of conventional WiFi terminals, the WiFi_CR terminal 111 further includes means for sensing the presence of RF interference signals, and means for controlling the wireless transmission and reception of data packets as directed by the NMS 300. In the shown embodiment, these additional means include a second WiFi radio 33, which is referred to herein as the WiFi sensor radio 33, an optional auxiliary sensor 52, a packet transmission control circuit (PTCC) 20, which may also be referred to herein as the Ethernet buffer board (EBB), a sensor and interference controller (SIC) 40, and an RFISC 50. In one embodiment, WiFi_CR Terminal 111 further includes a GPS (global positioning system) receiver 66 for providing terminal location information and/or a timing signal for terminal time synchronization, as further described hereinbelow.

Generally, a WiFi CR terminal 111 in the WiFi CR network 100 can experience interference from two types of sources: interference from other WiFi terminals, which is referred to herein as WiFi interference, and interference from non-IEEE 802.11, i.e. non-WiFi, sources of electromagnetic radiation that emit in the operating RF range of the WiFi_CR Terminal 111.

When present, the auxiliary sensor 52 performs the task of measuring interference from non-WiFi sources. It may be in the form of any suitable frequency-selective detector of RF power, which are well known in the art. The auxiliary sensor 52 is optional and may be omitted in some embodiments.

According to one embodiment of the invention, WiFi_CR Terminal 111 utilizes the additional WiFi sensor radio 33 for sensing the WiFi interference; it can be embodied with a conventional WiFi radio card, such as that illustrated in FIG. 5B, wherein the WiFi transmitter 371 may remain idle/unused or be absent, and a WiFi receiver 372 is used for processing WiFi signals and extracting therefrom WiFi packets, including WiFi packets that are not addressed to this particular terminal 111 and thus may result in WiFi interference for the terminal. Thus, in the shown embodiment WiFi_CR Terminal 111 includes two WiFi radios: the WiFi data radio 37 configured for supporting WiFi data communications over one or more WiFi channels in accordance with channel and transmission time slot assignments received from the NMS 300, and the WiFi sensor radio 33 for sensing radio signals in other WiFi channels that are not assigned to the respective WiFi terminal for data communications and for detecting WiFi packets therein. In one embodiment, the WiFi sensor radio 33 may also tune to the WiFi channel allocated to the data radio 37 for data transmission, such as to detect WiFi packets at the allocated channel that are not addressed to the host terminal. RF ports of each of these WiFi radios 33, 37 are connected to the antenna 55, which may be composed of several antennas, by means of the RF interface/splitter circuit (RFISC) 50. RFISC 50 may be a conventional interface/splitter circuit composed of RF switches, amplifiers, couplers and other devices common to RF engineering practice for the purposes of amplification, switching, or coupling RF signals transferred between antenna 55 and the WiFi data radio 37, sensor radio 33, or auxiliary sensor 52. In embodiments wherein the antenna or antennas 55 is a directional antenna which reception/transmission directivity is steerable in a plurality of directions, the RF interface/splitter circuit (RFISC) 50 also functions as the antenna direction control module to control the antenna's direction of transmission and reception. In one embodiment, the antenna direction can be changed in response to an antenna direction control signal generated by PTCC 20 in accordance with antenna direction assignments received from NMS 300.

The WiFi sensor radio 33 receives WiFi configuration information 47, which may include channel and measurement time information, from SIC 40, which also includes an interference processor unit 44, and a terminal time (TT) control logic (TTC) 42, which functions will be described more in detail hereinbelow. In one embodiment, SIC 40 has its own IP address 49 stored in memory, and can receive IP packets from NMS 300 carrying sensing control information, which may specify channel measurement schedule.

The sensor radio 33 may be set by the SIC 40 to any WiFi channel or a subset of channels in the ISM band for a predefined duration of time, for example for 500 msecs between transmission bursts of the data radio 37 and during receive time slots thereof, to record and quantify detectable IEEE 802.11b/g/a interference signals as received by the antenna 55. By way of example, in one embodiment the sensor radio 33 may perform an 11 Wi-Fi channel scan over the 2400-2500 MHz to determine the intensity and occupancy of Wi-Fi interference on each channel. If the WiFi_CR Terminal 111 is operating in an antenna-centric mode with directional antennas 55 as described hereinbelow, specific direction ranges can be separately quantified for interference.

WiFi signals detected by the sensor radio 33 represent actual or potential interference for the data radio 37 and is referred to herein as WiFi interference. Demodulated WiFi packets 80 from the sensor radio 33, which are also referred to herein as interference packets, are passed by the router 30 to the SIC 40, where they are processed to extract interference information therefrom based at least in part on an analysis of packet headers. In one embodiment, only the packet headers are passed by the router 300 to the interference processor 44.

According to an aspect of the present invention, analysis of packet headers of WiFi packets detected over a range of WiFi channels and over time provides valuable information about WiFi interference sources and patterns at WiFi terminal locations; this information is used to realize an efficient CR network system with an adaptive network-wide interference avoidance.

Figure 7:
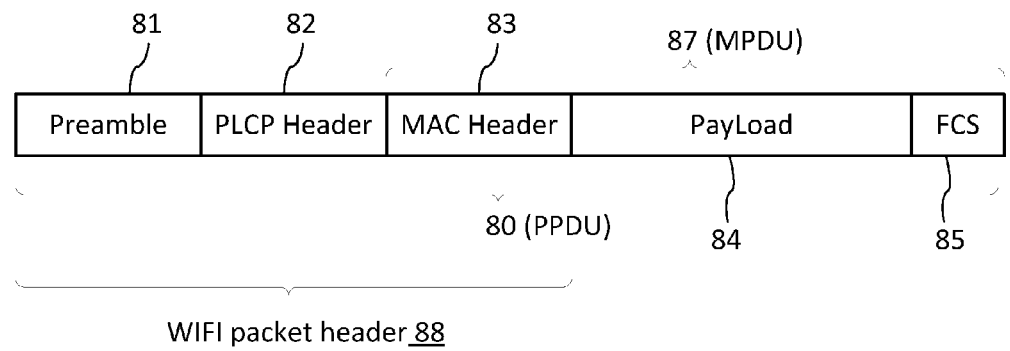
FIG. 7 is a schematic diagram of a WiFi packet showing packet headers.

With reference to FIG. 7, a typical WiFi packet 80 at the output of the sensor radio 33 includes a PLCP (Physical Layer Convergence Protocol) preamble 81, a PLCP header 82, a MAC header 83, a payload 84 and a frame check sequence (FCS) 85. The WiFi packet 80 is also known as a PLCP protocol data unit (PPDU), and is composed of a MAC protocol data unit (MPDU) 87, the PLCP header 82 and the preamble 81. The PLCP preamble 81, PLCP header 82, and MAC header 83 together may also be referred to herein as the WiFi packet header 88. The PLCP Preamble 81 consists of an 80-bit Synch sequence of alternating ones and zeros, and a 16-bit SFD (start frame delimiter).

Referring now to both FIG. 5 and FIG. 7, the interference processor 44 may extract the following information from the PLCP header 82 of the WiFi packet 80 received from the sensor radio 33: an identifier of a WiFi channel, such as the WiFi channel number, at which the packet has been transmitted, modulation rate and modulation type information. Additionally, the following information may be extracted by the interference processor 44 from the MAC header: destination and source addresses, length of the packet, BSSID (basic service set identifier) of the interferer, SSID (service set identifier) of the interferer.

In addition, during the preamble stage of receiving the WiFi packet 80, which is also known as 802.11 frame, the sensor radio 33 may acquire the received signal strength indicator (RSSI) that characterizes the strength of potential interference due to the detected WiFi packet.

Additionally the interference processor 44, either alone or in cooperation with relevant circuits of the sensor radio 33, may also obtain, by a suitable processing of the detected WiFi packets, the following interference-related information: occupancy time of WiFi channel by interference from one or all detected WiFi interferers relative to total monitoring time; the number of interference packets having the same BSSID, SSID, or MAC source and destination addresses; interference occupancy time as a function of antenna directivity setting on antennas 55; time of interference detection; channel of detection of interference versus the channel on which the interference packet was transmitted; the received signal strength of the interference; the differentiation, type, and composition of the interference packets; the modulation rate of the interference packets; and the size of the interference packets. Furthermore, SIC 40 can be programmed to process collected interference information as required for a particular application and deployment environment. For example, SIC 40 may be programmed to determine correlations between interference events, such as to estimate the dependent behavior of one interference source on another's transmission, or to determine the mean time between transmissions for packets having a common BSSID, or other identifying parameter. The SIC 40 can be programmed to receive information taken simultaneously from the auxiliary sensor 52 and the WiFi Sensor radio 33 and identify related events that themselves can be deemed as sensed outcomes.

The WiFi interference information obtained by the SIC 40 based on the receiver output of the sensor radio 33, and optionally additional interference information collected from the output of the auxiliary sensor 52, is passed as the interference information 98 to the NMS 300, either via the Ethernet port 10 or using the data radio 37. In one exemplary embodiment, the interference information 98 is passed to the NMS 300 over TCP/IP using a Subscriber Station Uplink RF (SSURF) message, possible content of which is illustrated in FIG. 6 by way of example. As illustrated, SSURF message may include additional terminal-related information, such as terminal location information that may be obtained from the GPS 66, terminal throughput and the like. Note that in other embodiments only a subset of the interference information illustrated in FIG. 6 may be transmitted, resulting in a shorter SSURF message. In yet other embodiments additional interference-related and terminal-related information may be included, depending on the system requirements and configuration.

In one embodiment, NMS 300 may actively solicit a SSURF report from any WiFi_CR terminal 111 at any time. Received SSURFs are time stamped by the NMS 300 and placed into REAM 320, which is accessible to the cognitive engines 310. Fast reporting of short SSURF messages may be performed at intervals in the order of a few to thousands of milliseconds, or at any desired intervals.

Based on the interference information contained in the SSURF messages received from the plurality of terminals 111, the NMS 300 generates terminal-specific transmission parameters for each of the terminals 111. In one embodiment, these terminal-specific transmission and reception parameters 99 include channel and transmission slot assignments for specific terminals 111. In embodiments wherein terminals 111 include steerable antennas, the transmission and reception parameters 99 may also include an antenna direction parameter. The channel number and antenna direction parameter may be specified for each assigned transmission and/or reception time slot, and/or based on the destination address for the respective WiFi terminal. The transmission and reception parameters 99 may optionally include also transmission power levels by time slot or by WiFi packet destination address for the respective WiFi terminal. In one embodiment, the NMS 300 communicates the transmission and reception parameters 99 to each WiFi_CR Terminal 111 as a scheduling code word Sch_Code_Word, which may be in the form of one or more IP packets.

In one embodiment, the WiFi_CR terminals 111 use a repeating set of synchronized, numbered timeslots of a predetermined duration to coordinate their transmission and reception periods with other terminals 111 in the network 100. Referring again to FIG. 5, these timeslots are created by a free-running counter 26 in the PTCC 20. The content of the counter 26 is referred to herein as Terminal Time (TT). By way of example, in one exemplary embodiment the TT counter 26 is clocked at 25 MHz to a 1 ppm accuracy, and the duration of each timeslot is selected to be 4 msec (milliseconds) for link speed of 6 Mbps and 2 msec for link speeds of 18 or 54 Mbps. In other embodiments other timeslot durations may be selected, depending on requirements of a particular implementation. TT can be reset by a synchronization pulse generated by the TTC 42 to synchronize it to other terminals 111 in the network 100.

Different mechanisms of synchronizing TTs across the network 100 may be contemplated within the scope of the present invention, including but not limited to the following three which are described hereinbelow: i) GPS synchronization, ii) beacon-assisted synchronization, and iii) broadcast packet assisted synchronization.

GPS Synchronization may be used if the WiFi_CR Terminal 111 includes the GPS receiver 66. In this approach, the data stream from the GPS receiver 66 is first checked for integrity. If there are no errors, the TT synchronization pulse is triggered by a 1 PPS signal from the GPS 66, resetting TT 26 once per second, with a typical accuracy of +/−50 nsec. This form of synchronization is well suited for outdoor multihop networks, but may not work for indoor networks because of the GPS signal loss.

Beacon-assisted synchronization is based on the detection of an end of a IEEE 802.11 beacon signal, or beacon frame, whether it be transmitted by the WiFi_CR Terminal 111 when the WiFi_CR Terminal 111 is configured as an AP, or received by it when the WiFi_CR Terminal 111 is configured as a client. Beacons are inherent to the DCF (Distributed Coordination Function) process of the IEEE 802.11 standard and are used to establish the AP/Client control hierarchy amongst terminals. In one embodiment of the present invention the transmission of the repetitive beacon is fixed to a predetermined period, for example about 200 msec. If the WiFi_CR Terminal 111 of FIG. 5 is configured as an AP, for example it is the AP WiFi_CR Terminal 111-1 of network 100 illustrated in FIG. 1, the TT counter 26 thereof is reset when the trailing end of the beacon frame is transmitted by the antenna 55 of the terminal, as detected for example by the RF interface/splitter circuit 50, to avoid the uncertainty due to possible delays of the beacon transmission associated with the CSMA/CA in the data radio 37. If the WiFi_CR Terminal 111 of FIG. 5 is configured as a client terminal, for example any of the client terminals 111-2, 111-3, 111-6, the TT 26 is reset upon detection of the beacon's end at the router 30. This process results in a periodic approximate re-synchronization of the AP and Client terminals 111 at each beacon interval. If beacons are not received, transmission by a WiFi terminal may be prevented, though reception may be maintained. Client terminals may undergo re-association with their AP if more than 11 consecutive beacons are missed, which is a standard practice in IEEE 802.11. We found that the aforedescribed process provides sufficient synchronization between AP and Client terminals to enable network-wide coordination of transmission and reception of WiFi packets by the NMS 300. We found also that propagation delays between terminals are relatively small and do not have to be corrected even for long-range outdoor systems under 12 Km in range. In our experiments beacon synchronization was found to be adequate at least for indoor CR networks having 1 hop, with more hops possible if systemic latency issues were not a problem.

Broadcast packet assisted synchronization (BPAS) involves broadcasting by an AP terminal, such as the BS 111-1 that operates as the master AP of the CR network 100, a TCP/IP packet to all its client terminals in the CR network 100. This TC/IP packet includes a value TT_AP of the TT counter of the BS terminal at the moment when a beacon is generated by the AP router board 30, or, more particularly, at the end of the beacon's transmission. Contrary to the beacon-assisted synchronization procedure described hereinabove, the TT in the AP terminal is not reset at the moment of beacon's generation. In one embodiment, the AP terminal time TT_AP is broadcast to the associated Clients via a modified TCP/IP Address Resolution Protocol (ARP) packet, and the BPAS synchronization approach is also referred to herein as the ARP-assisted synchronization. Client terminals compute the time offset T_off between an end of each received beacon and receiving the broadcast packet since the received beacon ended, and this time offset is added to the TT_AP value received in the ARP message and then reset their TT accordingly to a new TT value TT_client=(TT_AP+T_off). In one embodiment, two such ARP packets may be transmitted after each beacon for redundancy.

In one embodiment, the modified ARP packet is sent by the AP terminal to the IP addresses 49 of SIC 40 of each client WiFi_CR Terminal 111 after broadcasting the beacon. In each client WiFi_CR Terminal 111, the TT control logic 42 starts the time counter TT_off upon receiving a 'beacon end' signal from the router 30. Upon receiving the ARP packet and reading the TT_AP value from its content, the TT control logic resets the TT counter 26 in the PTCC 20 to the received TT_AP value plus the current value of the TT_off counter.

The BPAS technique can be used to distribute synchronization in multihop links, wherein each subsequent AP after the master AP operates at its own beacon period, and can extend from outdoor APs into indoor APs wherein GPS synchronization is not available. Referring to FIG. 1, the exemplary network 100 shown therein includes at least two network cells 'A' and 'B' that are organizes around AP terminals 111-1, and 111-2, respectively, with WiFi_CR Terminal 111-2 serving as a client in cell 'A' and as the AP of cell 'B'. If the beacon transmission by the APs 111-1 and 111-2 are not synchronized, the beacon-assisted synchronization, wherein the TT counter is re-started at each beacon's reception, would not enable synchronous timeslots in 'A' and 'B' network cells. Instead, in the BPAS technique the TT counter of the client terminal 111-4 in cell 'B' is synchronized to the TT counter of the BS 111-1 with the assistance of the modified ARP packet generated by the AP 111-2. The client side of the relay terminal 111-2, which belongs to cell 'A', may be synchronized to BS 111-1 using the beacon-assisted or GPS synchronization, and may transfer its synchronization to the AP side of relay terminal 111-2, so that the TT counter of the AP side of the WiFi_CR terminal 111-2 is synchronized to the TT counter of the BS 111-1.

The ARP-assisted synchronization can be thus used over multiple hops to synchronize TDD frames over a plurality of adjoined cells in the network such as cells A and B in network 100. It may be, however, less resilient to propagation errors compared to the more simple beacon-based synchronization. Note that multi-hop networks and relay nodes can be created by connecting Client and AP terminals back to back at their Ethernet ports, as illustrated in FIG. 2; accordingly the WiFi network 100 is capable of sharing a common timing at the 'hop' terminals 111-2 and 111-3. In another embodiment, inter-cell timing synchronization of the TT counters of different terminals may be implemented by synchronizing beacons of the AP side of the relay terminals to beacon reception at the client side thereof. Considering again by way of example network cells 'A' and 'B' that are joint at the relay terminal 111-2 as illustrated in FIG. 1, wherein the relay terminal 111-2 is formed of the client terminal 111-A of cell 'A' and the AP terminal 111-B of cell 'B' as shown in FIG. 2, in this embodiment the client-side terminal 111-A of the relay 111-2 signals to the AP-side terminal 111-B thereof when 111-A receives a beacon from BS 111-1. The AP-side of the relay terminal 111-2 generates its beacon immediately thereafter, within limitations of the technology, thereby effectively synchronizing its beacon period and timing to that of the BS 111-1. This process enables to synchronize TDD frame timing over multiple network cells and multiple 'hops' at relay terminals.

Figure 8:
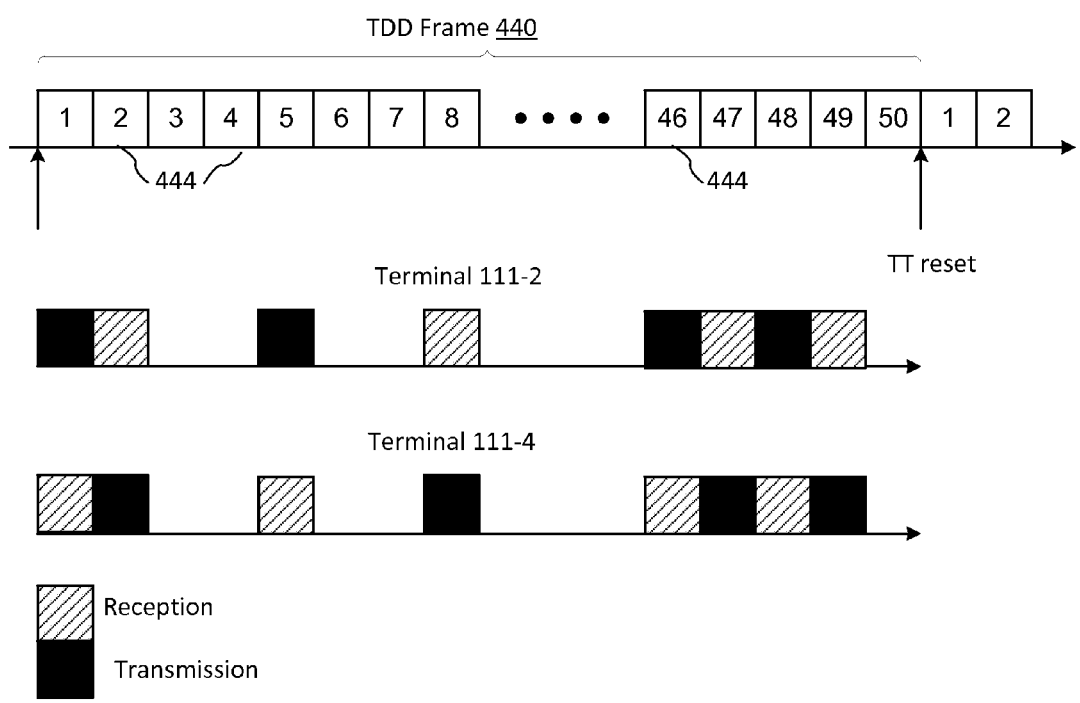
FIG. 8 is a schematic diagram illustrating a TDD frame and time slots therein that are allocated for transmission between a client terminal and an AP terminal.

Turning back to FIG. 5, once the TT counter 26 in the PTCC 20 is synchronized, WiFi_CR Terminal 111 implements temporal and, optionally, spatial scheduling of WiFi transmission using transmission control logic (TCL) 27 implemented in the PTCC 20, and organizing the WiFi transmission in TDD (time domain duplexing) frames 440 that are divided in timeslots 444 as illustrated in FIG. 8. The TCL 27 controls the timing and/or antenna direction of the transmission of each packet in accordance with the Sch_Code_Word that WiFi_CR Terminal 111 receives from the NMS 300, releasing the data packets received from the Etherner port 10 to the WiFi data radio 37 for WiFi transmission in time slots synchronized to the TT counter 26 and in accordance with the time slot assignments or an antenna direction assignment received from the NMS 300. Sch_Code_Word specifies transmission parameters for the particular WiFi_CR Terminal 111 to which it is addressed, and in particular specifies, within the TDD frame 440, those of the timeslots 444 that are allocated to the terminal for the WiFi packets transmission, and may also specify timeslots allocated to the WiFi_CR Terminal 111 for the WiFi packet reception. One of the purposes of the Sch_Code_Word is to ensure that the multiplicity of terminals 111 synchronize the times in which some terminals transmit, and some receive.

In one embodiment, the width, in time slots, of the TDD time frame 440 is defined by the length of the word. By way of example, in one embodiment Sch_Code_Word is 50 timeslots wide, and is terminal-specific. It can be transmitted at any time by the NMS 300, but its first execution is initiated by the TCL 27 only upon a reset of the TT counter 26. The same Sch_Code_Word may be executed repeatedly, starting at each TT reset, until a new word is received.

Further by way of example and with reference to FIG. 8, Sch_Code_Word sent by NMS 300 to WiFi_CR Terminal 111-2 may allocate $1^{st}$, $5^{th}$, $46^{th}$, and $48^{th}$ timeslots in each TDD frame 440 for transmission to the IP address of WiFi_CR Terminal 111-4, and $2^{nd}$, $8^{th}$, $47^{th}$ and $49^{th}$ timeslots for the reception from WiFi_CR Terminal 111-4, while Sch_Code_Word sent by NMS 300 to WiFi_CR Terminal 111-4 may allocate $1^{st}$, $5^{th}$, $46^{th}$, and $48^{th}$ timeslots in each TDD frame 440 for reception from WiFi_CR Terminal 111-2, and $2^{nd}$, $8^{th}$, $47^{th}$ and $49^{th}$ timeslots for the transmission to WiFi_CR Terminal 111-2. Furthermore, Sch_Code_Word that is sent, for example, to the AP WiFi_CR Terminal 111-2 may allocate other time slots for reception and transmission of data packets to/from other client terminals associated therewith, that are not shown in FIG. 1, implementing thereby time domain multiplexing (TDM). Accordingly, network 100 may be said to be operating in TDD/TDM mode, and the coordinated timeslot scheduling implemented in network 100 may also be referred to herein as the coordinated TDD/TDM scheduling.

The width of each timeslot is preferably selected so as to accommodate a longest expected WiFi packet accounting for system and terminal delays, guard bands, and the like. By way of example, if 6 Mbps data rates are used, the timeslots 444 may be 4 msec long, and Sch_Code_Word is 50 timeslots wide. In the case of beacon- or ARP-assisted synchronization described hereinabove with 802.11 beacon period of 200 msec, one Sch_Code_Word defined sequence is executed by the TCL 27 in each beacon period, as illustrated in FIG. 6, which shows TDD frame 440 bounded by two TT resets. In the case of the GPS synchronization, Sch_Code_Word is executed five times between the 1000 msec GPS-synchronized reset period. For data rates of 18 or 54 Mbps, timeslots 444 may be 2 msec wide. The PTCC 20 ensures that the Wi-Fi packets that are going to be transmitted by the Wi-Fi Data Radio 37 can be packed into the duration of a time-slot. In one embodiment, PTCC 20 calculates the duration of the Wi-Fi packet based on the length of the IP Ethernet word entering from Ethernet port 10 and the modulation rate of the Wi-Fi Data Radio 37. In one embodiment, PTCC 20 presents packets on a one-by-one basis to the Wi-Fi data Radio 37, and if the duration of time left between the transmission of the last packet and the edge of the time slot is not adequate for the subsequent packet, that packet will be delayed until the next time slot. In this manner the Wi-Fi Data Radio 37 is prevented from transmitting outside the specific time slot.

A maximum of 50 different WiFi terminals 111 within a same network can be addressed using the Sch_Code_Word of this length. More terminals can be addressed by sending alternating Sch_Code_Words prior to expiry of the current beacon or GPS timing TT reset interval. Additionally, common quiet periods can be addressed, allowing all terminals 111 in the network 100 to sense the environment without intra-network, inter-terminal interference. The number and duration of such periods can be dynamically adjusted.

Packets that are received from the Ethernet port 10 are generally not sent directly to the router 30, but are instead held in the PTCC 20 to be passed to the router 30 in one of the allocated time slots. For that purpose, PTCC 20 includes one or more FIFO (first in first out) buffer memory units 22, hereinafter referred to as FIFO 22, wherein the Ethernet packets are temporally stored until a 'packet release' signal from the TCL 27. In one embodiment, WiFi_CR Terminal 111 is configurable to operate in either an AP mode or a client mode, and includes a plurality of FIFOs 22, for example four or more. When configured in the AP mode, PTCC includes an IP address memory for storing a list of IP addresses 24 of all client terminals in the network that are associated with the WiFi_CR Terminal 111. In another embodiment, IP addresses 24 may be stored in router 30. Each of the FIFOs 22 is associated with one or more of the client IP addresses 24, and in operation is used for buffering Ethernet (TCP/IP) packets addressed to the respective clients. The packets are released according to the time slot and/or antenna direction assignments in the Sch_Code_Word. If WiFi_CR Terminal 111 is for operating as a client only, PTCC 20 may include a single FIFO 22 for holding packets awaiting allocated time slots for transmission to an associated AP terminal.

TCP/IP packets released by PTCC 20 in accordance with the time slot assignments are provided to router 30, which forwards them to the Wi-Fi Data Radio 37, which converts them into WiFi data packets 80 as illustrated in FIG. 7. A typical TCP/IP packet may be held in FIFO 22 for a duration of a few time slots 444, or from a few milliseconds to hundreds of milliseconds by way of example. WiFi data radio 37 may be implemented using a conventional WiFi radio card that is 802.11 compliant. Such radio cards include a buffer for temporally storing TCP/IP packets, to be realized for converting into RF WiFi packets and wireless transmitting in accordance with the CSMA/CA protocol.

In one embodiment, control of the transmission timing also achieves a de facto control of the reception timing. In this embodiment, whenever the router 30 and the data radio 37 does not have a buffered Ethernet packet, the data radio 37 automatically enters the receive state. By use of this operational attribute and control of transmission time and duration, the WiFi_CR Terminal 111 can be constrained to specific transmission and reception intervals, thus implementing Time Division Duplexing (TDD). To take full advantage of TDD, synchronization is required across the network 100, as described hereinabove.

In one embodiment, the WiFi data radio 37 implements the conventional 802.11 CSMA/CA protocol. In this embodiment, a WiFi packet entering the WiFi data radio 37 will typically be transmitted by the antenna within a few hundred microseconds of its arrival, or considerably less than the duration of one time slot 444. In one embodiment, the PTCC 20 releases data packets one at a time to be passed to the data radio 37 as WiFi packets also one at a time, to be transmitted by the data radio 37 in accordance with the CSMA/CA protocol. The WiFi data radio 37 transmits a packet that has been provided to it only after it undertakes a clear channel assessment (CCA) process, which takes 4 microseconds according to the IEEE 802.11 standard. This assessment takes place when the WiFi data radio 37 has a packet in its buffer, and prior to transmission. If the WiFi channel assigned for the data transmission is determined as being occupied during the assessment, the WiFi radio 37 will postpone the transmission by setting a random exponential counter. This will incur a delay in the transmission, which we do not want.

In one embodiment, the CSMA/CA protocol in the data radio 37 may be disabled, either permanently or temporarily, so as to substantially minimize the variable delay associated therewith. If the terminal is configured as an Access Point (AP), the CSMA/CA protocol can be completely disabled by manipulation of a hardware register of the data radio 37, which disables the exponential backoff and Clear Channel Assessment (CCA). An Ethernet packet presented to the router 30 is then transmitted with a minimum of delay, which is due only to the processing time of the router 30. However, such operation may not be possible to program into the router if it is configured as a Client device. Accordingly, embodiments of the present invention utilize for this purpose PTCC 20 inserted between the router 30 and its wireline backhaul connection 10.

Accordingly, in one embodiment the CSMA/CA protocol of the data radio 37 may be disabled by using the PTCC 20. To accomplish this, the TCL 27 of the PTCC 20 may be provided with control logic for controlling switching behavior of the RFISC 50, which is connected to the PTCC 20 by a control path 39. In particular, the PTCC 20, immediately after releasing a packet to router 30 for transmission by data radio 37, may send a signal to RFISC 50 to switch the RF path of the data radio 37 to a source of thermal noise 52, such as a 50 ohm load or equivalent, which is at the Boltzmann thermal noise floor of the receiver, or the lowest possible noise level that can be assessed. Such a low received RF power level indicates the absence of interference, or 'Clear Channel" signal to the CCA process of the CSMA/CA state machine of data radio 37, causing the data radio 37 to transmit the packet in its buffer using its shortest processing delay. As soon as the transmission of the packet by data radio 37 is detected by an RF power detector of RFISC 50, it switches the RF path of data receiver 37 from the 50 ohm load 53 to the transmit path connected to the antennas 55.

Advantageously, aforedescribed modifications to the operation of conventional 802.11-compliant WiFi terminals may be done while still using the Distributed Coordination Function (DCF) of the IEEE 802.11 standard. DCF mediates the handshaking necessary to maintain the single AP to multiple Client terminals hierarchy. Terminal registration protocols, encryption, broadcast beacon, and other functions necessary to the background configuration, maintenance, and operation of a WiFi network may be utilized in embodiments of the present invention.

Figure 9:
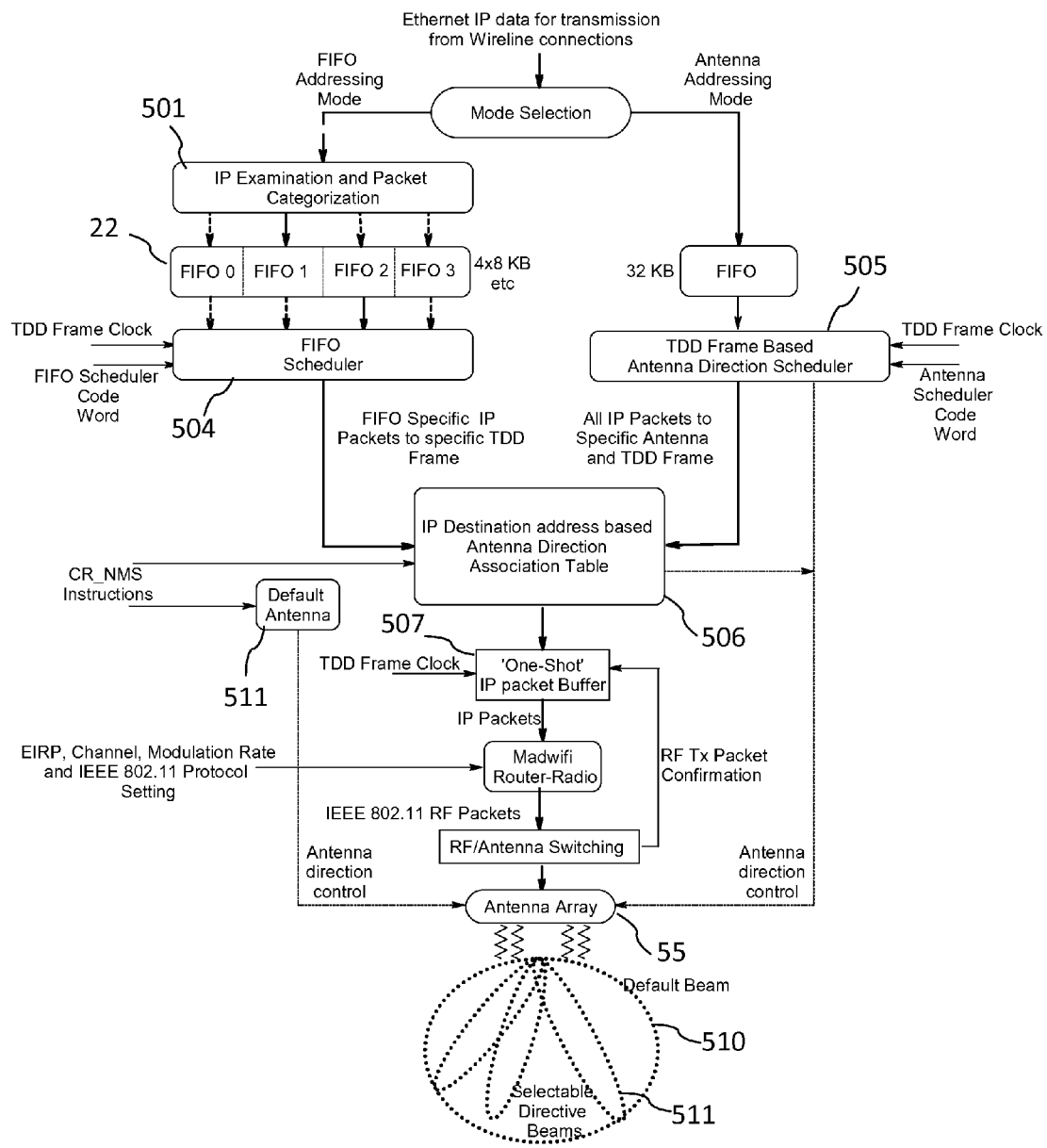
FIG. 9 is a schematic diagram illustrating an operation flow in the CR WiFi terminal in a FIFO-centric and an antenna-centric modes of operation thereof.

Referring now to FIG. 9, in one embodiment a WiFi_CR Terminal 111 configured to function as an AP, such as BS 111-1, may operate in one of two modes: a) a FIFO-centric, or FIFO-addressing mode (FAM) and b) an antenna-centric, or antenna-addressing mode (AAM); FIG. 9 schematically illustrates the operation control flow at WiFi_CR Terminal 111 for each of these modes.

In the FIFO-centric mode, the Sch_Code_Word received by the WiFi_CR Terminal 111 may specify destination IP addresses 24 associated with each FIFO 22, and timeslots in which each FIFO 22 is to be emptied and its content passed to the data radio 37 for wireless transmission. By way of example FIG. 9 illustrates an embodiment with 4 FIFOs of 8 KB each. An IP packet processing logic 501 of PTCC 20 examines IP packets received from the Ethernet port 10, sorts them based on the destination IP address thereof, and passes each of them to a corresponding FIFO 22 that is associated with the destination IP address of the packet. A FIFO scheduling logic 504 of TCL 27 is synchronized to TDD Frame clock pulse based on the TT counter 26, releases the packets from respective FIFOs in accordance with the time slot assignments received with Sch_Code_Word. In this manner the cognitive engines 310 of the NMS 300 can schedule transmission of potentially interfering packets in a same or overlapping channel to interference free timeslots. Under this type of operation WiFi_CR Terminal 111 may utilize a default omni-directional antenna 511 for transmission of the WiFi packets as illustrated at 510.

The Antenna-centric mode achieves spatial control of WiFi packet transmissions by programming PTCC 20 to use a single FIFO, which by way of example in this case may be 32 KB, based on a destination-address-based antenna direction association table (DABADAT) 506, which is provided by the NMS 300 to allocate specific antenna directions 511 to specific destination (IP) address. In this mode all Ethernet packets are held in the single FIFO; a TTD-frame-based antenna direction scheduler logic 505 of PTCC 20 coordinates their release in assigned time slots with setting the antenna 55 to a specific direction in accordance with DABADAT 506 and the packet destination address. This mode is useful, for example, for reconfigurable mesh networks and relay architectures.

Note that DABADAT 506 may also be used in FIFO-centric mode for per-packet antenna steering. In both modes, each released packet is held in a 'one shot' packet buffer 507 that may be configured at the router-side output of PTCC 20, prior to be passed to the router 30. In this fashion PTCC 20 may coordinate per-packet directional steering of the WiFi transmission. The antenna direction may be maintained until the terminal receives an IEEE 802.11 ACK packet acknowledging the receipt of the transmitted packet by the destination client. The packet steering may be used for interference reduction and link budget enhancement, and also for tracking and communicating with a mobile client. By way of example, in one experimental implementation eight different antenna positions may be selected, and greater number of different positions may be used in other embodiments. In FIFO-centric mode, each IP packet is loaded from FIFOs 22 into a specific TDD slot and that slot may be optionally addressed to a specific antenna port or antenna direction by the Sch_Code_Word. In Antenna-centric mode, packets are associated with a specific antenna or antenna direction based on the destination address of the packet.

Figure 10:
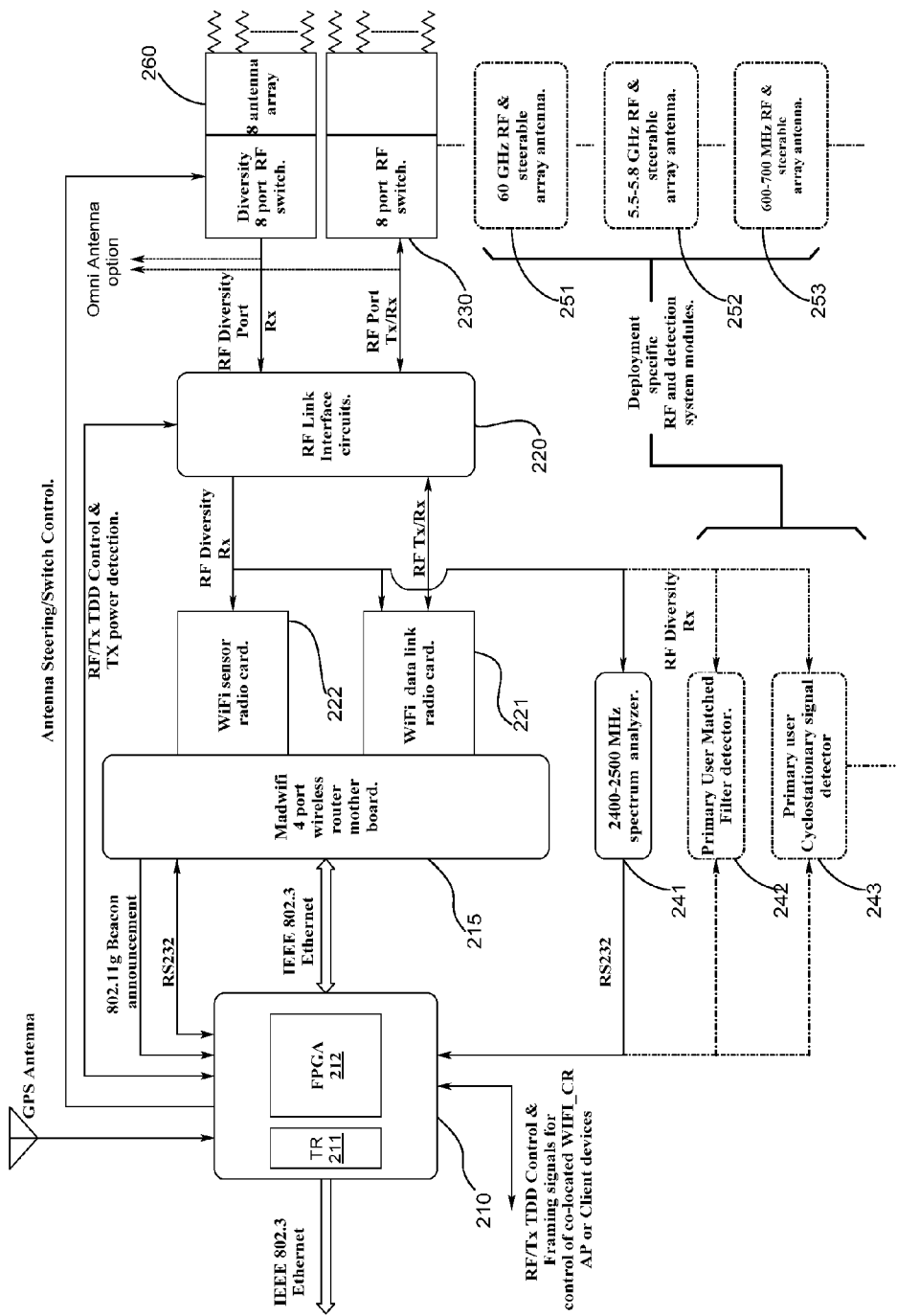
FIG. 10 is a block diagram of an exemplary implementation of the CR WiFi terminal of FIG. 5.

With reference to FIG. 10, there is illustrated a block diagram of one exemplary implementation of WiFi WiFi_CR Terminal 111 using inexpensive off-the-shelf hardware including commercially available WiFi devices with added control shell elements. The terminal of FIG. 10 is built around a router board 215, embodied as router board RB433 manufactured by MikroTik, Riga, Latvia, having Atheros 802.11 chipsets and a modified MadWifi driver, and two CM9 wireless radio cards 222, 221 connected thereto, which embody the sensor and data radios 33, 37 of the WiFi_CR Terminal 111 of FIG. 5, respectively. The router board 215 includes a processor that is programmable to implement all the functionalities of functional blocks 30 and 40 of the WiFi_CR Terminal 111 of FIG. 5. Modifications to the MadWifi driver made it possible to implement interference monitoring and rapidly change such characteristics of a WiFi radio as the equivalent isotropically radiated power (EIRP), channel setting, and modulation rate. Certain IEEE 802.11 protocol features such as RTS/CTS, acknowledgement, CSMA/CA inactivation, contention window size, and CCA threshold can also be individually and independently set on the WiFi radios 222, 221. The ability to adjust or disable such features may be advantageous for implementing a configurable PHY layer of the WiFi CR system of the present invention wherein the decision as to when, or when not, to transmit RF packets is a deterministic process controlled by specific CR algorithms 310. The pseudo-random and asynchronous exponential back-off algorithm, which is a core feature of the IEEE 802.11 DCF protocol, may either be entirely disabled or heavily limited in at least some embodiments of the present invention.

Configuration changes to the Madwifi router 215 can be done remotely by the NMS 300 using IP communications. By way of example, instructions can be passed to the router 215 to configure the Wi-Fi Data Radio 37 to change its modulation rate or transmission power. The driver software of the router board 215 is modified to enable sending SSURF messages with the interference information over IP to the cognitive engines 310 resident in the NMS 300, and to receive Sch_Code_Word messages from the NMS 300 to the IP address of the router. Having IP-based control and sensing is advantageous as the cognitive engines 310 require only a standard TCP/IP protocol stack to support the remote radio control and sensing functions for the WiFi terminals 111, thereby implementing an IP-based 'cognitive control channel'.

In the shown embodiment, terminal 200 utilizes two antenna arrays 260, each of 8 antenna elements, which are connected to antenna ports of an RF Link interface circuit 220 using two 8-port switches 230. Utilizing two independent antenna arrays enables the sensor radio card 222 to perform radio environment measurements independently in time and direction from the transmission and reception operation of the data radio card 221. Furthermore, the sensor radio card 222 may be re-configured, with the addition of RF frequency translation subsystems which are known in the art, to work in the TV bands or at 60 GHz. To support such sensing, additional antennas 251-252 may be provided.

Continuing to refer to FIG. 10, various functionalities of the PTCC 20 of the transmitter of FIG. 5 are implemented using an Ethernet buffer and FIFO circuit board (EBB) 210. By way of example, EBB 210 is composed of a dual port Ethernet transceiver 211 and an Altera FPGA chip 212, which is programmed to receive, examine, and hold Ethernet packets in FIFO buffers defined therein, and to control the RF switch 230 for mimicking clear channel conditions to the router's radio 221 by introducing a minimum noise floor to the radio's RF chain, as described hereinabove with reference to FIG. 5. The FPGA 212 of the EBB 210 also calculates the size of the Ethernet packet and determines the actual radio transmission duration for the packet.

By control of the transmission timing, we also achieve a de facto control of the reception timing. Whenever the router does not have a buffered Ethernet packet, it automatically enters the receive state. By use of this operational attribute and control of transmission time and duration, the router can be constrained to specific transmission and reception intervals, thus implementing Time Division Duplexing (TDD). To take full advantage of TDD, synchronization is required across the CRN.

By way of example, in one experimental embodiment we used the FPGA 212 of EBB 210 was programmed in VHDL-1993 using the Altera tool Quartus II version 9.1 using known Altera-specific functions, namely RAMs and FIFOs. One skilled in the art will be able to perform this programming having the benefit of the present description. Furthermore, the code may be generalized so that it would be easily transportable to any hardware platform, including but not limited to FPGA, gate array, standard cell, etc. Interfaces to attached devices, such as the Router Board 215, Spectrum Analyzer board 241, GPS module, other WiFi terminals use common protocols such as RS-232, RS-485, or Ethernet. Similarly, a flexible FIFO handling scheme is provided allowing the ability to allocate memory in support of temporal or spatial packet scheduling, as described hereinabove with reference to FIG. 9. EBB 210 includes RAM, which may be defined in FPGA 212, for buffering data in the internet-to-Router Board path, for example 32 kbytes. This RAM can be allocated by the NMS 300 to 1 to 4 FIFOs, for example using the Sch_Code_Word. Two selectable modes for FIFO operation within the WiFi terminal have been described hereinabove, however, due to the reprogrammable nature of the FPGA 212, it is possible to implement other types of modes for customized CR implementations.

Terminal 200 further includes additional circuitry, including one or more auxiliary sensors 241, 242, 243, for sensing the radio environment of the terminal in specific frequency ranges or originated form specific primary users of the ISM band. For that purpose, a portion of an RF signal from the measurement antenna 260 is split off and provided to the one or more auxiliary sensors, such as the spectrum analyzer 241 for measuring RF spectrum in the 2400-2500 MHz frequency band or other frequency band of interest, a primary user matched filter detector 242, and a primary user cyclostationary signal detector 243.

In the terminal 200, the sensor information from sensors 241-242 is first sent over an RS232 bus to the FPGA 212 which then forwards the sensor information to the processor of the router board 215 by RS232. The processor of the router board 215 translate the sensor data in a desired format and used it to create the SSURF packets which are sent back to the NMS 300 via the Ethernet 802.3 link. FPGA 212 is further programmed to implement some of the functionalities of TTC 42 of FIG. 5, and includes code for communicating with the GPS, synchronizing the TT counter to the 1 pps signal thereof, extracting basic position information and passing it to the processor in the router 215 via an RS232 connection.

In one embodiment, 'Antenna' or 'FIFO' mode, described hereinabove with reference to FIG. 9, is set by the NMS 300 sending a message to the router 215, which sends a message to the EBB 210. Fields in the Sch_Code_Word may be used to allocate specific timeslots to either specific FIFOs or specific antennas, for example depending on a mode identifier in the Sch_Code_Word. By way of example, if antenna mode is set and the first 5 entries of the Sch_Code_Word, which define timeslots 1, 2, 3, 4, 5, are 0100=4, 0111=7, 0010=2, 1110=E, 0001=1, then the Least Significant Bits of these entries, which are 0, 1, 0, 0, 1, define which timeslots are allocated for transmission (timeslot 2). Transmissions or receptions in these timeslots are to occur via antennas 010=2, 011=3, 001=1, 111=7 and 000=0 respectively. All data to be transmitted on-air will be stored in FIFO 0, so it should be configured to utilize all 32 kB of capacity. If the NMS 300 sets up FIFO mode with the above Sch_Code_Word entries, and the Destination Table 506 is also configured, a packet that matches a destination IP address in that Table will use the FIFO associated with the destination IP address in the Table. Instead of the Sch_Code_Word bits 010, 011, 001 and 111 referring to antennas, they now refer to FIFOs, so the first 5 timeslots are now associated with FIFOs 10=2, 11=3, 01=1, 11=3 and 00=0 (i.e. only the least significant 2 bits of the antenna/FIFO bits select a FIFO).

Embodiments of WiFi_CR terminal have been described hereinabove with reference to block diagrams and process flowcharts illustrated in FIGS. 2, 5, 5B, 9 and 10. Each block in these diagrams and flowcharts is a functional unit of a respective WiFi_CR terminal adopted to perform one or several steps or processes in accordance with the method of the present invention in one embodiment thereof; these steps and processes have also been described in conjunction with the description of the corresponding functional blocks. The various functional units shown as blocks in FIGS. 5 and 10 can be integrated or separate structures implemented in either software or hardware or a combination thereof commonly known to provide the functionalities described hereinbelow, including but not limited to DSPs, ASICs, FPGAs, microprocessors, general purpose processors, and analogue RF, HF and UHF circuitry.

Cognitive Radio Network Management System

Referring again to FIG. 1, NMS 300 provides network-wide coordination of WiFi packet transmission between the WiFi terminals 111 based on interference information it collects from the terminals 111. In one embodiment, NMS 300 implements this functionality using TCP/IP messaging and other common networking protocols. NMS 300 may also provide a control interface to the CR network 100, which a user could use to configure the network in according to specific deployment and other requirements.

Figure 11:
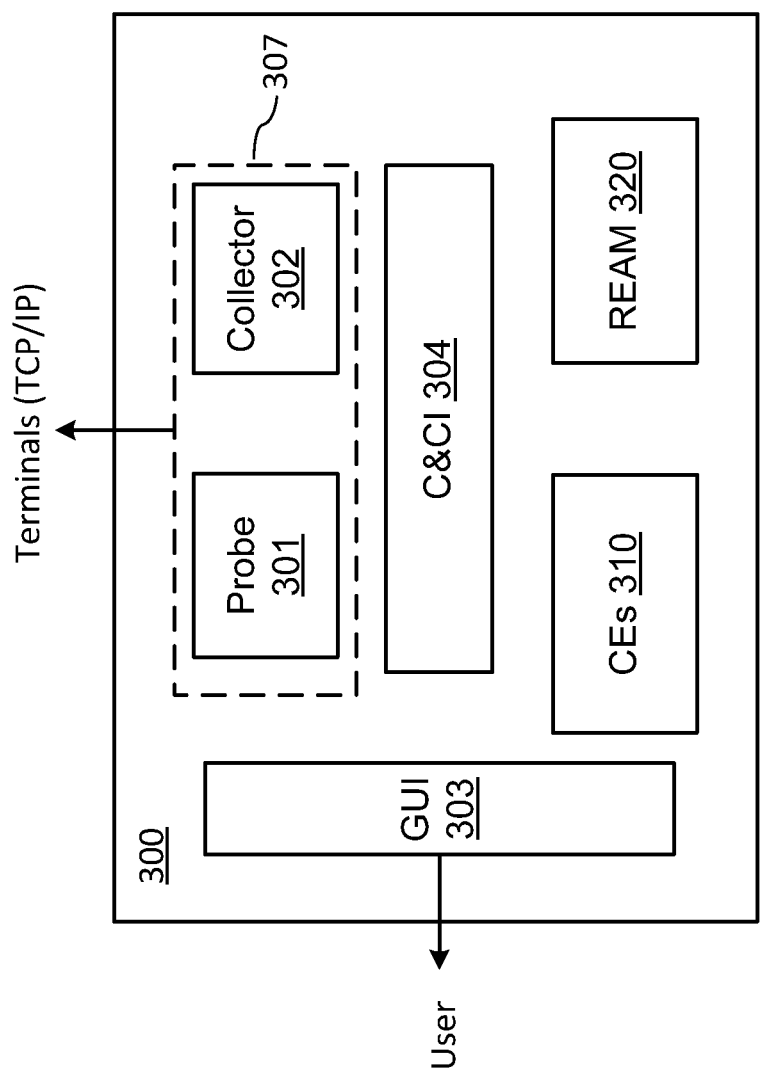
FIG. 11 is a schematic block diagram of the NMS.

With reference to FIG. 11, NMS 300 includes a network interface 307, which in turn includes a probe module 301 and a collector module 302, the CEs 310, NRED 320, a control and configuration interface (C&CI) 304, and a graphical user interface (GUI) 303. The network interface 307 includes a probe module 301 and a collector module 302. Modules 301-304, 310 and 320 may be embodied in software that is stored in non-transitional computer readable memory, for example in the NMS computer 125 (FIG. 1), and are executable by a digital processor such as that of the NMS computer 125. In other embodiments one or both CEs 310 and NRED 320 may be stored and/or executed remotely at a remote location or locations having a network connection to the computer 125. When executed by a computer, these modules give rise to corresponding computer processes that may be referred to herein using the names and reference numerals of the respective modules. These modules and their corresponding processes perform the following functions:

The probe module 301 imitates a probe process that probes a pre-configured range of IP addresses to detect the availability of APs in the CR network 100. This includes, for example, sending a message to each AP terminal in the CR network 100 to find out what client terminals are currently associated with it. A collector process 302 is associated with each AP within the CR network 100, in order to handle the NMS interaction with this AP and its associated Client stations.

The collector module 302 corresponds to one or more collector processes, each undertaking the interaction with a corresponding AP, for example one of the AP terminals 111-1, 111-2, and 111-3 illustrated in FIG. 1, and client terminals associated therewith, including collecting the interference information from these terminals, passing this information to C&CI 304 for optional pre-processing and storing in NRED database 320, and sending messages to terminals 111 setting up various wireless operating parameters thereof under the control of the Cognitive Engines 310, or an operator using the GUI 303. In one embodiment, the collector module 302, through its corresponding collector processes, collects SSURF messages from terminals 111, passes the interference information contained in each SSURF message to NRED 320, and sends terminal-specific transmission parameters received from CEs 310 to corresponding terminals 111 in the form of Sch_Code_Word messages.

GUI module 303 provides a user interface to an operator to view in NRED 320 key parameters associated with terminals 111 in the CR network 100 and enable the operator to control some of terminal's parameters, such as configure equivalent isotropically radiated power (EIRP) of the terminal, transmission rate, scheduling code word, etc. through the use of a graphical interface. In one experimental embodiment, GUI 303 has been implemented using the Qt graphical library to ensure the portability and the open source attribute of the CR-NMS application.

The C&CI module 304 provides an application programming interface (API) containing one or more API libraries for supporting communications between the network interface 307, the CEs 310 and NRED 320. By way of example, it may include and API for the CEs 310 to retrieve information about the terminals 111 from NRED 320. It may further includes a component, such as an API, for assembling and/or pre-formatting the interference information read from content of SSURF messages for communicating to NRED 320. How the assembly of the interference data is done my depends on network 111 and particular implementation of NMS 300.

By way of example, C&CI 304 may use the raw interference data from terminals 111 to create a database of primary interference data in NRED 320, and may then use interference data from the primary database to create a secondary database, such as a database of historical records of transmission path losses and propagation statistics between the terminals 111 of the network 100. C&CI 304 may further include a component for the provisioning of transmission and reception parameters to the terminals 111 based on an optimized network TDD/TDM schedule generated by the CEs 310.

The CEs module 310 may contain one or more cognitive engines running in parallel or according to a schedule. These engines may assess and utilise different aspects of network data stored in NRED 320. The CEs may also interact with NRED 320 directly, to form secondary information databases based on pre-processing of the primary interference, status and traffic data from the terminals 111. By way of example, one CE may be responsible for ensuring fairness in the assignment of a channel. The second CE may be responsible for ensuring that the network's terminals have optimal scheduling based on their traffic. CEs module 310 may also contain a CE that reads inter-terminal propagation data stored in NRED 320 and calculates a distribution of transmission power settings for each or some of the terminals 111 in the network 100 for minimising WiFi interference in the network, and/or to assign suitable link power margins for inter-terminal links having a larger than average propagation loss variance.

Figure 12:
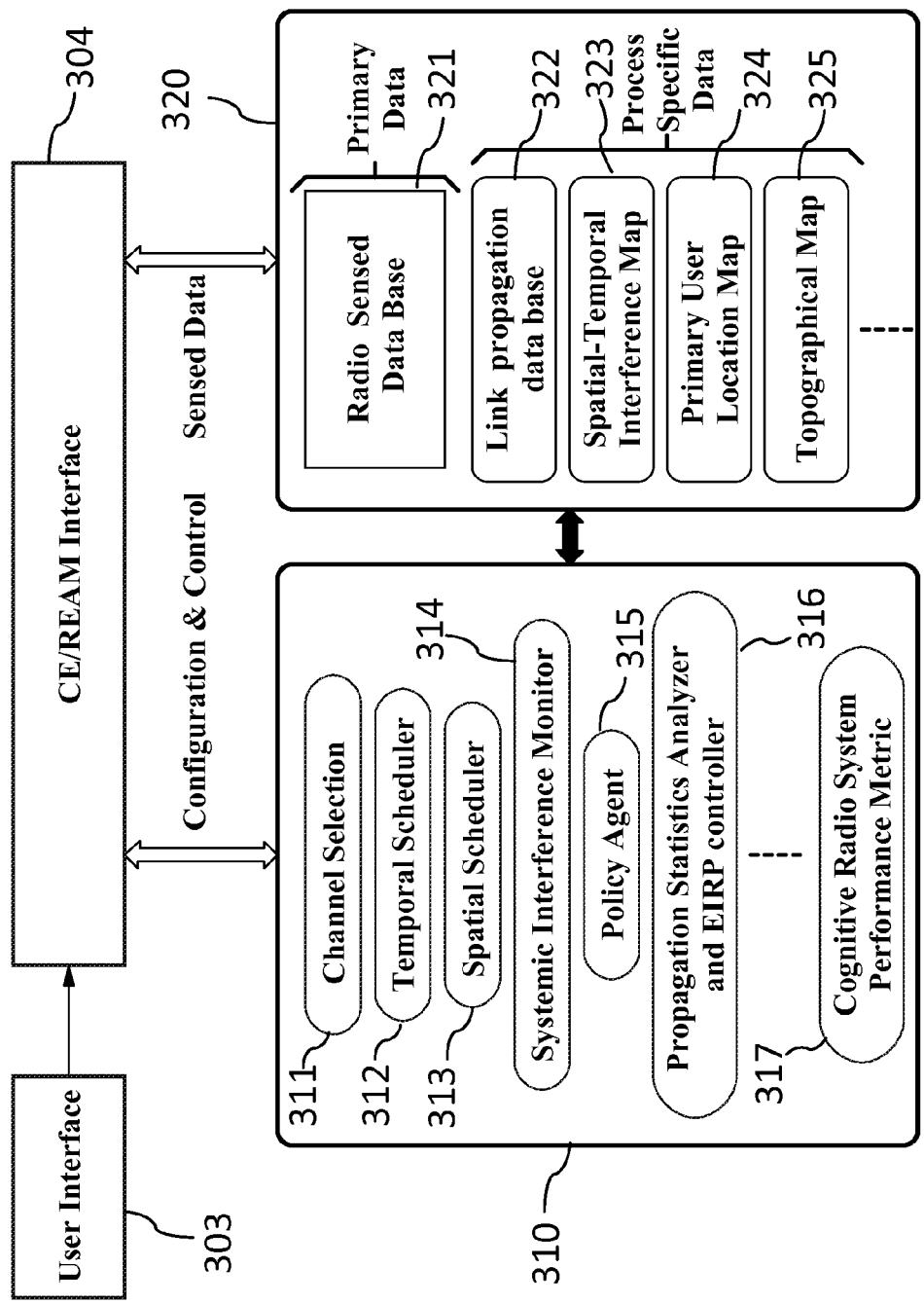
FIG. 12 is a schematic block diagram illustrating exemplary components of the cognitive engine module of the NMS, and of the network radio environment database.

The CE algorithms communicate the settings to 300, which then creates a new power setting for the network, and links the terminal IDs to the settings and send them off as API settings for the specific terminals in the network With reference to FIG. 12, content of NRED 320 and CE module 310, which form a 'cognitive' core of the NMS 300, are illustrated in accordance with an exemplary embodiment of the invention. NRED 320, which may be embodied using a relational database, contains historical record of interference information collected from the terminals 111. By way of example, in one experimental embodiment it is implemented using an open-source object oriented database management system PostgreSQL developed by the PostgreSQL Global Development Group and released under the PostgreSQL License; other suitable open source or proprietary database systems, including but not limited to MySQL, may also be used. In the exemplary embodiment shown in FIG. 12 it includes a primary data module (PDM) 321, which stores historical records of the interference information retrieved from the WiFi_CR terminals 111, and a collection of process specific data modules. These process-specific data modules may include: a link propagation database 321, spatial-temporal interference map data 323, primary user location map data 324, and topographical map data 325.

By way of example, the link propagation database 321 may include a table of mean path losses between terminals specified by their source addresses or geographical locations. The spatial-temporal interference map data 323 may include a listing of the dominant Wi-Fi interference source addresses and their occupancy statistics as measured at a specific terminal of the cognitive radio network 100 or the geographical location of the terminal. The primary user location map data 324 may include the geographical locations of primary users, their channel numbers, and other information related to interference control and primary use of bandwidth, as for example in the case of Television White Space (TVWS) users operating in the TVWS bands, if the CR network 100 is implemented using Wi-Fi in the TVWS bands, as indicated by the IEEE 802.11af standard. The topographical map data 325 may include information on the topographical features common to the geographical region of the network's deployment area; this information is useful to the implementation of ray-tracing path prediction or spatial isolation processes that can be implemented by a suitable selection of channels and antenna directivity. The CEI 304 may utilizes the SQL query language as a flexible way for the cognitive engines module 310 to harvest interference sensing information stored in the NRED database 321.

Generally, CEs module 310 may include one or more algorithms for generating, based on the historical record of interference information at the WiFi terminals 111 stored in NRED 320, an optimal transmission and reception TDD/TDM schedule for WiFi communications between terminals 111 of the network 100 that would avoid WiFi interference between the terminals and minimize the likelihood of interference from other RF sources such as primary users of the ISM band. This includes generating specific coordinated transmission and reception parameters for each of the terminals 111, which may include specifying, for each of the terminals 111, timeslots allocated to the terminal for transmission and reception of WiFi packets, specifying WiFi channels to be used in the allocated timeslots, and further optionally specifying specific antenna directions to be used for transmission or reception in the allocated timeslots.

By way of example, CE module 310 may include one or more of the following components: a channel selector 311 for generating a coordinated WiFi channel plan for terminals 111, a temporal scheduler 312 for generating coordinated timeslot allocation plans for terminals 111, a spatial scheduler 313, a systemic interference monitor 314, a policy agent 315, a propagation statistics analyzer 316, and a CR System performance meter 317 for assessing predicted performance of the network 100 for the network transmission plan generated by modules 311-312. These modules may implement suitable software algorithms, including but not limited to learning, correlation, optimization, event recognition, and the like, and those skilled in the art will be able to select such algorithms without undue experimentation. Modules 311-313 may be executed iteratively so as to maximize the expected network performance as predicted by the CR System performance meter 317 based on the historic interference data stored in NRED 320.

In one embodiment, the channel selector 311 includes computer instructions for generating a coordinated WiFi channel plan for terminals 111 based on the stored in NRED 320 information regarding the interference environment detected at the terminals 111 in the network 100, the data throughput requirements as reported by the terminals 111. In one embodiment, the channel selection may take into account an outcome of a fairness assessment algorithm such as the Jain's Fairness Index, or Max/Min fairness, which are known in the art network bandwidth allocation procedures.

In one embodiment, the temporal scheduler 312 includes computer instructions for generating coordinated timeslot allocation plans for terminals 111, whereby transmission and reception slots are assigned in dependence of the bandwidth demand and/or interference environment data at the individual terminals 111 based on the historical interference information stored in NRED 320. In one embodiment, the spatial scheduler 313 may include computer instructions for generating antenna direction assignments for one or more of the terminals 111, which may be time slot specific, to support uplink and/or downlink data transmission between a specific client WiFi_CR Terminal 111 and an AP terminal associated therewith. In one embodiment, the systemic interference monitor 314 may be provided that includes computer instructions for monitoring temporal behavior of radio interference throughout network 100 or at specific terminals 111, and/or monitoring the diurnal variations in Wi-Fi interference intensity. The systemic interference monitor 314, when present, may be used for supporting the channel selection algorithm providing a predictive noise and interference capability for the network 100.

The policy agent 315, which may be incorporated in some embodiments, may include computer instructions for implementing particular network policies. Examples include limiting the radiated power of specific terminals 111 equipped with high directivity antennas, or ensuring that point to point radio links operating between terminals 111 in certain operating frequency bands, for example in the 5825-5850 MHz band in certain jurisdictions, can be provided with higher transmit powers as allowed by regulations. The policy agent 315 may also monitor specific interference data in NRED 320 signaling the presence of radio signals from primary ISM band users, such as interference data from the Cyclostationary Signal Detector 243 that may be configured for example to detect primary user Radar signals in the 5.5 GHz band, and generate a message requiring the network 100, or a portion thereof, to retune to alternate, non-interfering channels, when the presence of a primary user is detected.

It will be appreciated that the particular structure and algorithms of NMS 300 described hereinabove, including particular modules of CE 310 and NRED 320, are by way of example only, and CE 310 and NRED 320 in particular may be implemented using a variety of differing software architectures and/or optimization algorithms. Advantages of the exemplary NMS architecture described hereinabove include a highly modular NMS design and the use of standard interfaces and protocols, where feasible, to facilitate the use of standard components and libraries. For example, it utilizes the SNMP protocol for the interaction with the wireless terminals 111, and a standard and widely deployed relational database for the NRED 320. Also, it provides the CR-NMS 300 in open source form, which can be used by researchers as a CR network testbed for experiments. By way of example, the Qt graphical library is used to implement the CR-NMS GUI.

The use of the CEs 310 and NRED 320 in the operation of CR network 100 may be illustrated by, but are not limited to, the following exemplary scenarios.

ISM Band White Space Spectrum discovery: A common problem is the selection a single ISM channel that can be used by a distributed set of AP/Client terminals forming long range (1-5 km link) urban roof-top point to multipoint distribution network. In this scenario, each Client WiFi_CR Terminal 111-2 to 111-6 and the BS 111-1 reports a different set of interference statistics and offered traffic requirements, i.e. reports by the client and access point terminals 111 of the average bandwidth the terminals are transmitting over a specified period of time, as may be monitored and reported by the PTCC 20 in some embodiments. Both interference and traffic are time variant. The channel selection module 311 examines records of the sensed information stored in the NRED 320 over a period of time, and uses the Jain fairness index, as described in "A Quantitative measure of fairness and discrimination for resource allocation in shared computer system", Jain, R. K. et al., DEC Research Report TR301, September 1984, to select candidate channels. An optimization algorithm used by CE 310, for example modules 311, 314, 315, performs calculations that trade fairness against systemic throughput prior, for example under the guidance of the policy agent 315, to choose a common channel for the network. The algorithm updates regularly, for example in a periodic manner, such as after a new set of sensed interference data is received reflecting a changed radio environment conditions in the network 100 or a portion thereof, and selects channel change time in a manner least disruptive to the network.

Policy Based Interference control: In this scenario, upon deployment of the CR network 100, NMS 300 solicits terminals 111 for location data provided by the terminal's GPS receivers. This information is stored in the NRED 320 and updated periodically or at prescribed intervals or events. The CE 310 queries a third-party data base containing deployment locations of intermittent primary users. Interference calculations, supported by propagation statistics based on RSSI measurements at the terminals, are used by the CE 310 to determine if the locations of the WiFi terminals 111 and the primary user terminals trigger a regulatory requirement. If so, the CR network 100 switches to an alternative channel that was calculated by the ISM Band White Space Spectrum discovery process described hereinabove.

A 'same channel single cell reuse/temporal or spatial isolation' scenario: FIG. 13A schematically illustrates, in the top portion thereof, an exemplary embodiment of the CR network 100, wherein two co-located AP terminals, which are labeled in the figure 'A' and 'B', and their associated client terminals 411 create a cell of two overlapping same channel sectors. These overlapping sectors are schematically indicated by dotted curves labelled 'AP(A)'s Coverage Area' and 'AP(B)'s Coverage Area', respectively. Partial isolation is provided by directive antennas of the APs 'A' and 'B' for each sector. Two of the client terminals, 411a and 411b, are within the coverage areas of both APs, and thus experience co-channel interference (CCI). This CCI is detected by sensor radios of each AP, which extract information about the interference from the headers of the detected interfering WiFi packets. The APs 'A' and 'B' transmit the interference reports with CCI information to the NMS 300, wherein they are stored in the NRED 320. The cognitive engine 310 in the NMS 300 mines the CCI reports in the NRED, identifying clients 411a and 411b that are suffering excessive co-channel interference. Once identified, IP traffic to these clients may be scheduled by the NMS into non-interfering time slots, as illustrated in the bottom portion of FIG. 13A. Alternatively, the NMS 300 may assign interference-prone clients 411a,b specific antenna directions having greater isolation, but narrower coverage. Exemplary antenna direction assignments for the APs 'A' and 'B' on a per-time-slot basis are illustrated in the bottom portion of FIG. 13B. For time slots allocated for transmission to terminals in well-isolated arrears, NMS 300 may assign broad-coverage antenna configurations, which coverage areas are labeled in the top potion of FIG. 13B as 'Coverage antenna A1' and 'Coverage antenna B1', respectively. For time slots allocated for transmission to terminals 411a and 411b in CCI arrears, NMS 300 may assign narrow-coverage antenna configurations specifically directed towards the CCI-prone terminals 411a,b, which coverage areas are labeled in the top potion of FIG. 13B as 'Coverage Antenna A2 Coverage Antenna B2 (Overlapping/Independent)' and 'Coverage Antenna A3 Coverage Antenna B3 (Overlapping/Independent)', respectively. Here, 'A2' and 'B2' refer to antenna configurations aimed at the terminal 411a for antennas of APs 'A' and 'B', respectively, and 'A3' and 'B3' refer to antenna configurations aimed at the terminal 411b for antennas of APs 'A' and 'B', respectively.

Although the present invention has been described in relation to particular embodiments thereof, many other variations and modifications and other uses will become apparent to those skilled in the art. All such variations, modifications, embodiments and improvements are considered to be within the scope of the present invention, as encompassed by the following appended claims. For example, although the CR WiFi terminals 111 and 200 illustrated in FIGS. 5 and 10 have been described hereinabove as including a second WiFi radio dedicated to sensing WiFi interference, in addition to a first WiFi radio used for data communications, in other embodiments the CR WiFi terminal may utilize a same WiFi radio for both the data communications, i.e. transmission and receiving WiFi data packets addressed to the terminal, and for sensing WiFi interference in time multiplexed manner, for example during pauses in the data communications when the WiFi radio would have been otherwise idle. In a further example, although the exemplary block diagrams in FIGS. 5 and 8 show the presence of router 30 or router 215, other embodiments of the WiFi_CR terminal of the presence invention may be implemented without using a router, in particular if the terminal is to be operated as a client only, or with parts of its functionality implemented in the EBB as required.

The above-described embodiments of the present invention can be implemented in any of numerous ways. For example, the embodiments and elements thereof may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device. Further, the computer may be physically connected to and part of the test system, or it may be connected via such interfaces as known in the art including, for example Ethernet, Bluetooth, WiFi, USB, the Internet, etc.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

For example, NMS 300 may be implemented using one or more computers. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Furthermore, each of the embodiments described hereinabove may utilize a portion of another embodiment. Of course numerous other embodiments may be envisioned without departing from the spirit and scope of the invention.

We claim:

1. A method for avoiding interference in a WiFi network comprising a plurality of WiFi terminals, the method comprising:
   a) using one or more of the WiFi terminals to collect radio interference information, wherein the radio interference information comprises packet header information for WiFi packets received over a plurality of WiFi channels;
   b) communicating the radio interference information from the one or more of the WiFi terminals to a network management system (NMS) for storing in a network radio environment database (NRED); and,
   c) receiving transmission and reception parameters sent by the NMS to the one or more of the WiFi terminals for use thereof in WiFi data communications by said one or more of the WiFi terminals so as to avoid or lessen radio interference in the WiFi network;
   wherein a) comprises collecting, by the one or more of the WiFi terminals, packet header information from the WiFi packets received by said one or more WiFi terminals over the plurality of WiFi channels, and wherein b) comprises communicating to the NMS the packet header information that is collected by the one or more WiFi terminals from the received WiFi packets as a part of the radio interference information.

2. A method of claim 1, wherein the transmission and reception parameters comprise at least one of: WiFi channel identifier for data communication, time slot assignments, transmission power assignments, and transmission data rate.

3. A method of claim 2, wherein the NMS analyzes the radio interference information received from the one or more WiFi terminals and creates historical interference records for each of the WiFi terminals, the historical interference records comprising information related to one or more of the following: WiFi terminal location, direction of the antenna used by the WiFi terminal to collect interference information, WiFi terminal transmission and reception data throughput rates, time of the collection of the radio interference information by the WiFi terminal, an identifier of the WiFi channel wherein WiFi interference was detected, and an average received signal strength of the WiFi packets received from all WiFi interference sources.

4. A method of claim 3, wherein the historical interference records for at least one of the WiFi terminals comprise time stamped information related to WiFi packets received over one or more of WiFi channels, including a source address of the WiFi packets, channel occupancy from the source address, an average RSSI related to the source address, and a number of WiFi packets received from the source address.

5. A method of claim 2, wherein the NMS transmits to each of the WiFi terminals a terminal-specific time slot assignment message specifying transmission and reception time slots for the respective WiFi terminal.

6. A method of claim 1, wherein the packet header information, which the one or more WiFi terminals communicate to the NMS, comprises one or more parameters selected from the list of: base station identifier (BSID), service set identifier (SSID), source MAC address, destination MAC address, payload size, modulation rate, and packet type.

7. A method of claim 6, wherein the radio interference information further comprises received signal strength indicator (RSSI), WiFi channel identifier of the WiFi packet reception, and occupancy time for the WiFi channel of the WiFi packet reception.

8. A method of claim 1, wherein the one or more WiFi terminals receive from the NMS a list of WiFi signal parameters to be collected in step (a).

9. A method for avoiding interference in a WiFi network comprising a plurality of WiFi terminals, the method comprising:
   a) using one or more of the WiFi terminals to collect radio interference information, wherein the radio interference information comprises packet header information for WiFi packets received over a plurality of WiFi channels;
   b) communicating the radio interference information from the one or more of the WiFi terminals to a network management system (NMS) for storing in a network radio environment database (NRED); and,
   c) receiving transmission and reception parameters sent by the NMS to the one or more of the WiFi terminals for use thereof in WiFi data communications by said one or more of the WiFi terminals so as to avoid or lessen radio interference in the WiFi network, wherein the transmission and reception parameters comprise at least one of: WiFi channel identifier for data communication, time slot assignments, transmission power assignments, and transmission data rate;
wherein the WiFi terminals comprise directional antennas for selectively transmitting or receiving WiFi signals in a plurality of spatial directions, and wherein:
   the radio interference information collected by each of the WiFi terminals and communicated to the NMS specifies antenna directions used by the WiFi terminal to receive the WiFi packets while collecting the radio interference information; and,
   the transmission and reception parameters that the NMS communicates to the WiFi terminals specify transmission or reception direction for the directional antenna in dependence upon at least one of: a time slot or a WiFi packet destination.

10. A method of claim 9, wherein each of the WiFi terminals receive from the NMS a terminal-specific time slot assignment message specifying transmission and reception time slots for the respective WiFi terminal, and wherein the terminal-specific time slot assignment message is transmitted using the TCP/IP protocol in the form of a scheduling code word (SCW), and wherein the terminal-specific time slot assignment message specifies: transmission and reception antenna directions by time slot or by WiFi packet destination address, and transmission power levels by time slot or by WiFi packet destination address for the respective WiFi terminal.

11. A method of claim 10, wherein each of the WiFi terminals executes the time slot assignments in accordance with the received SCW upon a reset of an internal terminal time (TT) counter, the method further comprising synchronising resets of the TT counters of different WiFi terminals to periodic synchronization events.

12. A method of claim 11, wherein the periodic synchronization events comprise one of: a GPS time reference signal, and a detection of a WiFi beacon frame.

13. A method of claim 11, wherein the plurality of WiFi terminals comprises an access point (AP) terminal and a client terminal in communication with the AP terminal, wherein the AP terminal periodically transmits the WiFi beacon frame at a prescribed time interval, the method comprising:
   re-setting the TT counter of the client terminal upon receiving the beacon frame from the AP terminal to a new TT value, wherein the new TT value is one of: a zero, or a non-zero TT value obtained based on a value of the TT counter of the AP terminal at beacon transmission contained in a broadcast packet received from the AP terminal.

14. A WiFi terminal comprising:
one or more WiFi radios configured for:
   supporting WiFi data communications over one or more WiFi channels in accordance with channel and transmission time slot assignments received from the NMS, and,
   sensing radio signals in other WiFi channels that are not assigned to the respective WiFi terminal for data communications, and detecting WiFi packets therein; and
one or more processors configured for collecting interference information related to the WiFi packets detected in the other WiFi channels for including into the interference information packet header information collected by the WiFi terminal from headers of the WiFi packets detected in the other WiFi channels that are not assigned to the respective WiFi terminal for data communications, and for transmitting the interference information to a network management system (NMS) using a wired or wireless connection.

15. A WiFi terminal of claim 14, wherein the one or more radios of the WiFi terminal comprise:
   a first WiFi radio comprising a WiFi transmitter and a WiFi receiver for providing WiFi data communications for the WiFi terminal, and
   a second WiFi radio comprising at least a WiFi receiver for sensing radio signals in the other WiFi channels that are not assigned to the WiFi terminal for data communications, and for detecting WiFi packets therein.

16. A WiFi terminal comprising:
one or more WiFi radios configured for:
   supporting WiFi data communications over one or more WiFi channels in accordance with channel and transmission time slot assignments received from the NMS, and,
   sensing radio signals in other WiFi channels that are not assigned to the respective WiFi terminal for data communications, and detecting WiFi packets therein; and
one or more processors for collecting interference information related to the WiFi packets detected in the other WiFi channels, wherein the interference information comprises packet header information, for transmitting to a network management system (NMS) using a wired or wireless connection;
wherein the one or more radios of the WiFi terminal comprise:
   a first WiFi radio comprising a WiFi transmitter and a WiFi receiver for providing WiFi data communications for the WiFi terminal, and
   a second WiFi radio comprising at least a WiFi receiver for sensing radio signals in the other WiFi channels that are not assigned to the WiFi terminal for data communications, and for detecting WiFi packets therein;
wherein the WiFi terminal further includes:
   a data port for receiving data packets to be transmitted using the first WiFi radio;
   a packet transmission control circuit (PTCC) comprising a terminal time (TT) counter and disposed in a data path between the data port and the first WiFi radio for temporary storing the received data packets, and for releasing the received data packets to the first WiFi radio for WiFi transmission in time slots synchronized to the TT counter and in accordance with the time slot assignments or an antenna direction assignment received from the NMS.

17. A WiFi terminal of claim 16, including a GPS receiver coupled to the processor for providing location information thereto for transmitting to the NMS, and coupled to the PTCC for providing timing synchronization pulses thereto for resetting an internal timing counter thereof.

18. A WiFi terminal of claim 16 comprising a TT control logic for providing a beacon frame announcement signal to the PTCC for resetting the TT counter thereof.

19. A WiFi terminal of claim 16, further comprising a directional antenna having an antenna direction control module, and a communication path between the PTCC and the antenna direction control module for controlling the transmission direction of the antenna in accordance with the antenna direction assignment received from the NMS.

20. A WiFi terminal of claim 16, wherein the PTCC comprises a plurality of FIFO buffer memory modules for temporary storing data packets for transmitting to a plurality of different destinations in the WiFi network in accordance with the time slot assignment received from the NMS.

21. A WiFi network system, comprising:
a plurality of the WiFi terminals as defined in claim 14, and the network management system (NMS);
wherein the NMS further comprises:
    a collector module for collecting the interference information from the WiFi terminals, and for communicating the transmission and reception parameters comprising the channel and transmission time slot assignments to the WiFi terminals;
    a network radio environment database (NRED) for storing time-stamped historical records of the interference information collected from the WiFi terminals at different times; and,
an analysis module for analyzing the historical records of the interference information stored in the NRED and for generating the transmission and reception parameters for the WiFi terminals.

\* \* \* \* \*